(12) United States Patent
Chen et al.

(10) Patent No.: US 9,996,726 B2
(45) Date of Patent: Jun. 12, 2018

(54) FEATURE IDENTIFICATION USING AN RGB-NIR CAMERA PAIR

(71) Applicant: QUALCOMM Incorporated, San Diego, CA (US)

(72) Inventors: An M. Chen, Rancho Santa Fe, CA (US); Shijia Pan, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/168,267

(22) Filed: Jan. 30, 2014

(65) Prior Publication Data
US 2015/0035961 A1 Feb. 5, 2015

Related U.S. Application Data
(60) Provisional application No. 61/861,915, filed on Aug. 2, 2013.

(51) Int. Cl.
*H04N 9/47* (2006.01)
*G06K 9/00* (2006.01)
(Continued)

(52) U.S. Cl.
CPC ..... *G06K 9/00067* (2013.01); *G06K 9/00375* (2013.01); *G06K 9/2018* (2013.01); *H04N 5/33* (2013.01); *H04N 9/04* (2013.01)

(58) Field of Classification Search
USPC .......................................................... 348/77
See application file for complete search history.

(56) References Cited

U.S. PATENT DOCUMENTS 6,424,727 B1   7/2002 Musgrave et al.
6,820,979 B1   11/2004 Stark et al.
(Continued)

FOREIGN PATENT DOCUMENTS

CN   101404060 A   4/2009
CN   101964056 A   2/2011
(Continued)

OTHER PUBLICATIONS

Goh Kah Ong Michael et al.( "A contact less biometric system using multiple hand features", Journal of Visual Communication and Image Representation, vol. 23, No. 7, Oct. 1, 2012 (Oct. 1, 2012), pp. 1068-1084, XP55149117, ISSN: 1047-3203, DOI: 10.1016/j.jvcir.2012.07.004.*

(Continued)

*Primary Examiner* — Behrooz Senfi
*Assistant Examiner* — Ana Picon-Feliciano
(74) *Attorney, Agent, or Firm* — Kilpatrick Townsend & Stockton/Qualcomm

(57) ABSTRACT

Disclosed are systems, apparatus, devices, methods, computer program media and products, and other implementations, including a method that includes capturing an RGB image of a hand of a person, capturing a near infrared (NIR) image of the hand, and determining geometrical features of the hand based on the captured RGB and NIR images. In some embodiments, determining the geometrical features may include determining from extracted image data for the hand one or more values representative of relative spatial features for the hand such as one or more of, for example an angle between a first pair of two fingers in the extracted image data for the hand, and/or a relative distance or length for a second pair of fingers in the extracted image data for the hand. In some embodiments, the method may further (Continued)

include determining identity of the person based on the determined geometrical features of the hand.

30 Claims, 7 Drawing Sheets

(51) Int. Cl.
   *H04N 5/33* (2006.01)
   *H04N 9/04* (2006.01)
   *G06K 9/20* (2006.01)

(56) References Cited

U.S. PATENT DOCUMENTS

| | | | |
|---|---|---|---|
| 6,920,236 | B2 | 7/2005 | Prokoski |
| 7,469,160 | B2* | 12/2008 | Banks ............... A61B 5/0059 600/123 |
| 7,602,942 | B2 | 10/2009 | Bazakos et al. |
| 7,693,307 | B2 | 4/2010 | Rieul et al. |
| 7,801,339 | B2 | 9/2010 | Sidlauskas et al. |
| 8,165,357 | B2 | 4/2012 | Rowe |
| 8,190,239 | B2 | 5/2012 | Endoh et al. |
| 8,345,936 | B2 | 1/2013 | Burge et al. |
| 8,374,404 | B2 | 2/2013 | Williams et al. |
| 8,408,821 | B2 | 4/2013 | Wu et al. |
| 8,411,909 | B1 | 4/2013 | Zhao et al. |
| 8,798,333 | B2 | 8/2014 | Hanna et al. |
| 8,953,849 | B2 | 2/2015 | Hanna |
| 8,965,063 | B2 | 2/2015 | Hanna et al. |
| 8,978,333 | B2 | 3/2015 | Potter et al. |
| 2003/0053664 | A1 | 3/2003 | Pavlidis et al. |
| 2005/0074167 | A1 | 4/2005 | Maeda et al. |
| 2006/0097172 | A1 | 5/2006 | Park |
| 2006/0104488 | A1 | 5/2006 | Bazakos et al. |
| 2006/0210261 | A1 | 9/2006 | Kakiuchi et al. |
| 2007/0248330 | A1 | 10/2007 | Pillman et al. |
| 2007/0268485 | A1 | 11/2007 | Polonskiy et al. |
| 2007/0297648 | A1 | 12/2007 | Endoh et al. |
| 2008/0192988 | A1* | 8/2008 | Uludag ............... G06K 9/00046 382/115 |
| 2009/0016574 | A1 | 1/2009 | Tsukahara |
| 2009/0060286 | A1 | 3/2009 | Wheeler et al. |
| 2010/0014718 | A1 | 1/2010 | Savvides et al. |
| 2010/0141770 | A1 | 6/2010 | Gomi |
| 2010/0290703 | A1 | 11/2010 | Sim et al. |
| 2013/0322729 | A1* | 12/2013 | Mestha ............... A61B 5/02 382/134 |
| 2013/0342702 | A1 | 12/2013 | Zhang et al. |
| 2016/0019420 | A1 | 1/2016 | Feng et al. |
| 2016/0019421 | A1 | 1/2016 | Feng et al. |
| 2017/0091550 | A1 | 3/2017 | Feng et al. |

FOREIGN PATENT DOCUMENTS

| | | | |
|---|---|---|---|
| EP | 1647936 | A1 | 4/2006 |
| JP | H01299488 | A | 12/1989 |
| JP | 2005502961 | A | 1/2005 |
| JP | 2007527270 | A | 9/2007 |
| JP | 2011243862 | A | 12/2011 |
| WO | 0129769 | A2 | 4/2001 |
| WO | 2005008566 | A1 | 1/2005 |

OTHER PUBLICATIONS

Goh Kah Ong Michael et al.( "A contact less biometric system using multiple hand features", Journal of Visual Communication and Image Representation, vol. 23, No. 7, Oct. 1, 2012 (Oct. 1, 2012), pp. 1068-1084, XP55149117, ISSN: 1047-3203, DOI: 10.1016/j.jvcir.2012.07.004. ).*

Nunez, Abel S. ("A Physical Model of Human Skin and Its Application for Search and Rescue", Doctoral Dissertation, Air Force Institute of Technology, Wright-Patterson AFB, Dec. 2009).*

Ferrer et al. (M. A. Ferrer, A. Morales, C. M. Travieso and J. B. Alonso, "Wide band spectroscopic skin detection for contactless hand biometrics," in IET Computer Vision, vol. 6, No. 5, pp. 415-424, Sep. 2012.).*

Bhokare R., et al., "Multispectral Palm Image Fusion: A Critical Review," International Journal of Advanced Research in Computer Engineering & Technology (IJARCET), Jun. 2013, vol. 2 (6), pp. 2159-2164.

Pavlidis, I. et al., "The Imaging Issue in an Automatic Face/Disguise Detection System," Proceedings of the IEEE Workshop on Computer Vision Beyond the Visible Spectrum: Methods and Applications, 2000, pp. 15-24, IEEE. doi:10.1109/CVBVS.2000.855246.

Fredembach, C. et al., "Combining visible and near-infrared images for realistic skin smoothing," Proceedings of the 17th Color and Imaging Conference (CIC), Jan. 1, 2009, pp. 242-247, Society for Imaging Science and Technology.

Kanzawa, Y. et al., "Human Skin Detection by Visible and Near-Infrared Imaging," MVA2011 IAPR Conference on Machine Vision Applications, Jun. 13-15, 2011, pp. 503-507.

International Search Report and Written Opinion—PCT/US2013/046366—ISA/EPO—dated Sep. 26, 2013, 12 pgs.

International Preliminary Report on Patentability—PCT/US2013/046366, European Patent Office—Pays Bas, The Netherlands, dated Aug. 22, 2014, 6 pgs.

International Preliminary Report on Patentability—PCT/US2013/046366, European Patent Office—Pays Bas, The Netherlands, dated Sep. 19, 2014, 7 pgs.

Bodade, R. et al., "Fake Iris Detection: A Holistic Approach," International Journal of Computer Applications, Apr. 2011, vol. 19, No. 2, pp. 1-7.

Boyce, C. et al., "Multispectral Iris Analysis: A Preliminary Study," Proceedings of the 2006 Conference on Computer Vision and Pattern Recognition Workshop (CVPRW), Jun. 2006, 9 pgs., IEEE.

Boyce, C. K, "Multispectral Iris Recognition Analysis: Techniques and Evaluation," Thesis Submitted to the College of Engineering and Mineral Resources at West Virginia University in Partial Fulfillment of the Requirements for the Degree of Master of Science in Electrical Engineering, Jan. 1, 2006, 102 pgs., West Virginia University, Morgantown. XP002593740.

Burge, M. J. et al., "Multispectral Iris Fusion and Cross-Spectrum Matching," In Handbook of Iris Recognition, Oct. 5, 2012, pp. 171-181, Springer-Verlag, London. XP055208926, doi:10.1007/978-1-4471-4402-1_9.

Hollingsworth, K.P. et al., "Image Averaging for Improved Iris Recognition," Advances in Biometrics, Jun. 2, 2009, pp. 1112-1121, Springer Berlin Heidelberg. XP019117900, doi:10.1007/978-3-642-01793-3_112.

International Search Report and Written Opinion—PCT/US2015/038458—ISA/EPO—dated Oct. 12, 2015, 18 pgs.

International Search Report and Written Opinion—PCT/US2015/038474—ISA/EPO—dated Sep. 29, 2015, 19 pgs.

International Search Report and Written Opinion—PCT/US2015/038500—ISA/EPO—dated Dec. 15, 2015, 20 pgs.

Koblova, E.V. et al., "Estimation of Melanin Content in Iris of Human Eye," SPIE Proceedings, May 2, 2005, vol. 5688, pp. 302-311, The International Society for Optical Engineering, San Jose, CA. XP55215478, ISSN: 0277-786X, doi:10.1117/12.593651.

Lee, S.J. et al., "Robust Fake Iris Detection Based on Variation of the Reflectance Ratio between the Iris and the Sclera," Biometrics Symposium: Special Session on Research at the Biometric Consortium Conference, Sep. 19, 2006, pp. 1-6, IEEE. XP031141447, doi:10.1109/BCC.2006.4341624.

Lee, S.J. et al., "Multifeature-based fake iris detection method," Optical Engineering, Dec. 4, 2007, vol. 46, No. 12, pp. 127204-1-127204-10. doi:10.1117/1.2815719.

Nemesin, V. et al., "Gradual Iris Code Construction from Close-Up Eye Video," Advanced Concepts for Intelligent Vision Systems, Sep. 4, 2012, vol. 7517, pp. 12-23, Springer Berlin Heidelberg. XP047016315, ISBN: 978-3-642-33139-8, doi:10.1007/978-3-642-33140-4_2.

Nguyen, K. et al., "Robust mean super-resolution for less cooperative NIR iris recognition at a distance and on the move," Proceedings of the 2010 Symposium on Information and Communication

(56) References Cited

OTHER PUBLICATIONS

Technology (SoICT '10), Jan. 1, 2010, pp. 122-127, ACM, New York, NY. XP055208559, ISBN: 978-1-45-030105-3, doi: 10.1145/1852611.1852635.
Park, J.H. et al., "Multispectral iris authentication system against counterfeit attack using gradient-based image fusion," Optical Engineering, Nov. 16, 2007, vol. 46., No. 11, pp. 117003-1-117003-14, Society of Photo-Optical Instrumentation Engineers (SPIE), Bellingham, WA. XP002593741, ISSN: 0091-3286, doi: 10.1117/1.2802367 [retrieved on Nov. 16, 2007].
Park, M.K. et al., "Super-resolution image reconstruction: a technical overview," Signal Processing Magazine, May 2003, vol. 20, No. 3, pp. 21-36, IEEE. XP011097476, doi:10.1109/MSP.2003.1203207.
Partial International Search Report—PCT/US2015/038500—ISA/EPO—dated Oct. 5, 2015, 6 pgs.
Tan, T. et al., "Iris recognition: recent progress and remaining challenges," SPIE Proceedings, Biometric Technology or Human Identification, Apr. 12, 2004, vol. 5404, pp. 183-194, Society of Photo-Optical Instrumentation Engineers (SPIE), Bellingham, WA. XP001509165, ISBN: 978-0/8194-5327-3, doi:10.1117/12.547686.
Vogel, A. et al., "Optical properties of human sclera, and their consequences for transscleral laser applications," Lasers in Surgery and Medicine, Jan. 1, 1991, vol. 11, No. 4, pp. 331-340, Wiley. XP055007203, ISSN: 0196-8092 , doi :10.1092/lsm.1900110404.
Sony. (1999). User's Guide for CCD B/W Camera Module, XC-E Series, Version 1.0—English, 39 pgs.
Ahonen, T. et al., "Face Description with Local Binary Patterns: Applications to Face Recognition," IEEE Transactions on Pattern Analysis and Machine Intelligence, Dec. 2006, vol. 28, No. 12, pp. 2037-2041, IEEE.
Anderson, R. R. et al., "The Optics of Human Skin," Journal of Investigative Dermatology, 1981, vol. 77, No. 1, pp. 13-19.
Van den Bergh, M. et al., "Combining RGB and ToF Cameras for Real-time 3D Hand Gesture Interaction," 2011 IEEE Workshop on Applications of Computer Vision (WACV), Jan. 5-7, 2011, pp. 66-72, IEEE. doi:10.1109/WACV.2011.5711485.
Boreki, G. et al., "Hand Geometry: A New Approach for Feature Extraction," UNICENP, 2005, 6 pgs., Curitaba, Brazil.
Conti, M. et al., "Mind How You Answer Me! (Transparently Authenticating the User of a Smartphone when Answering or Placing a Call)." Proceedings of the 6th ACM Symposium on Information, Computer and Communications Security (ASIACCS), Mar. 2011, pp. 249-260, ACM.
Fischler, M. A. et al., "Random Sample Consensus: A Paradigm for Model Fitting with Applications to Image Analysis and Automated Cartography," Communications of the ACM, Jun. 1981, vol. 24, No. 6, pp. 381-395, ACM.
Heisele, B. et al., "A Component-based Framework for Face Detection and Identification," International Journal of Computer Vision, Aug. 2007, vol. 74, No. 2, pp. 167-181, Springer Science, United States.
Jain, A. K. et al., "A Prototype Hand Geometry-based Verification System," Procedures of 2nd International Conference on Audio- and Video-Based Biometric Person Authentication (AVBPA), Mar. 1999, pp. 166-171, Washington, Dc.
Klare, B. et al., "Heterogeneous Face Recognition: Matching NIR to Visible Light Images," 2010 20th International Conference on Pattern Recognition (ICPR), 2010, pp. 1513-1516, IEEE. doi:10.1109/ICPR.2010.374.
Li, J. et al., "Live Face Detection Based on the Analysis of Fourier Spectra," Biometric Technology for Human Identification, Proceedings of SPIE, 2004, vol. 5404, pp. 296-303, Bellingham, WA. doi:10.1117/12.541955.
Lowe, D. G., "Distinctive Image Features from Scale-Invariant Keypoints," International Journal of Computer Vision, 2004, vol. 60, No. 2, pp. 91-110, Kluwer, The Netherlands.
Mavadati, S. M. et al., "Fusion of Visible and Synthesised Near Infrared Information for Face Authentication," Proceedings of the 2010 IEEE 17th International Conference on Image Processing (ICIP), Sep. 2010, pp. 3801-3804, IEEE.
Ong, M. G. K. et al., "Automated Hand Geometry Verification System Base on Salient Points," The 3rd International Symposium on Communications and Information Technologies (ISCIT 2003), 2003, vol. 2, 4 pgs.
Myneni, R. B. et al., "The Interpretation of Spectral Vegetation Indexes," IEEE Transactions on Geoscience and Remote Sensing, 1995, vol. 33, No. 2, pp. 481-486, IEEE.
Nunez, A. S. et al., "Detection of Human Skin in Near Infrared Hyperspectral Imagery," Geoscience and Remote Sensing Symposium (IGARSS), Jul. 7, 2008, pp. II-621-II-624, IEEE.
Ong, M. G. K. et al., "A Single-sensor Hand Geometry and Palmprint Verification System," Proceedings of the ACM SIGMM Workshop on Biometrics Methods and Applications (WBMA), Nov. 8, 2003, pp. 100-106, ACM.
Pan, G. et al., "Liveness Detection for Face Recognition," Recent Advances in Face Recognition, Delac, et al. (Ed.), Dec. 2008, pp. 109-123, I-Tech, Vienna, Austria. ISBN: 978-953-7619-34-3.
Shi, W. et al., "SenGuard: Passive User Identification on Smartphones Using Multiple Sensors," Proceedings of the 2011 IEEE 7th International Conference on Wireless and Mobile Computing, Networking and Communications (WiMob), Oct. 10-12, 2011, pp. 141-148, IEEE.
Suvonvorn, N. et al., "Real-Time Face Detection/Identification for Surveillance System," International Conference on Electronic Design, 2008, pp. 1-5.
Yl, D. et al., "Face Matching Between Near Infrared and Visible Light Images," In Advances in Biometrics, Proceedings of the International Conference (ICB 2007), Seoul, Korea, Aug. 27-29, 2007, pp. 523-530, Springer Berlin Heidelberg. doi:10.1007/978-3-540-74549-5_55.
Zhu, J. et al., "SenSec: Mobile Security through Passive Sensing," Proceedings of the 2013 International Conference on Computing, Networking and Communications (ICNC), Jan. 28-31, 2013, pp. 1128-1133, IEEE, Washington, DC. doi:10.1109/ICCNC.2013.6504251.
International Preliminary Report on Patentability—PCT/US2014/046071, European Patent Office—Pays Bas, The Netherlands, dated Dec. 14, 2015, 6 pgs.
He, Y., Hou, Y., Li, Y., & Wang, Y. (Oct. 12, 2010). Liveness iris detection method based on the eye's optical features. Proceedings of SPIE 7838, Optics and Photonics for Counterterrorism and Crime Fighting VI and Optical Materials in Defence Systems Technology VII. pp. 1-8. International Society for Optics and Photonics. doi:10.1117/12.868899.
Li, Y-H. (Jan. 1, 2010). Robust Long Range Iris Recognition from Video Using Super Resolution (Doctoral dissertation, IBM Research). 177 pgs. XP55307829.
Light. (n.d.). In Wikipedia. 12 pgs. Retrieved on Jul. 9, 2014 from http://en.wikipedia.org/wiki/Light XP055307506.
International Search Report and Written Opinion—PCT/US2014/046071—ISA/EPO—dated Nov. 6, 2014, 11 pgs.
Ferrer M.A., et al., "Wide band spectroscopic skin detection for contactless hand biometrics", IET Computer Vision, The Institution of Engineering and Technology, Michael Faraday House, Six Hills Way, Stevenage, Herts. SG1 2AY, UK, vol. 6, No. 5, Sep. 21, 2012 (Sep. 21, 2012), pp. 415-424, XP006040017, ISSN: 1751-9632, DOI: 10.1049/IET-CVI.2011.0062.
Michael G.K.O., et al., "A contact less biometric system using multiple hand features", Journal of Visual Communication and Image Representation, vol. 23, No. 7, Oct. 1, 2012 (Oct. 1, 2012), pp. 1068-1084, XP55149117, ISSN: 1047-3203, DOI:10.1016/j.jvcir.2012.07.004.

\* cited by examiner

FEATURE IDENTIFICATION USING AN RGB-NIR CAMERA PAIR

CLAIM OF PRIORITY UNDER 35 U.S.C. § 119

The present application claims the benefit of and priority to U.S. Provisional Application Ser. No. 61/861,915, entitled "Methods and Apparatus for User Identification Through RGB-NIR Camera Pair," filed Aug. 2, 2013, which is assigned to the assignee hereof, and expressly incorporated herein by reference.

BACKGROUND

Solutions to protect computing devices (e.g., handheld devices as mobile devices) from unauthorized access include prompting a user to enter a 4-number pin or perform a swipe pattern. These solutions have some vulnerability because they do not use biometric data to determine user's authorization to access the device. In another solution, a device may be equipped with a fingerprint reader and allow access upon verification that the fingerprints) of the user attempting to get access matches predetermined set(s) of fingerprints. This approach, however, requires additional expensive hardware, takes up a relatively large portion of the available space on the device, and is susceptible to ongoing use-based wear and tear.

SUMMARY

In some variations, a method is disclosed. The method includes capturing an RGB image of a hand of a person, capturing a near infrared (NIR) image of the hand, and determining geometrical features of the hand based on the captured RGB and NIR images.

Embodiments of the method may include at least some of the features described in the present disclosure, including one or more of the following features.

The method may further include aligning the captured RGB image with the captured NIR image.

Determining the geometrical features of the hand may include extracting image data for the hand based on RGB image data from the captured RGB image and on NIR image data from the captured NIR image.

Extracting the image data for the hand may include computing a first value and a second value for each of at least one pixel of the captured RGB image based on a respective RGB pixel value for the at least one pixel and on a respective NIR pixel value for a corresponding pixel of the captured NIR image, and determining that a particular pixel from the at least one pixel of the captured RGB image corresponds to the hand when the first value for the particular pixel is within a first predetermined value range and the second value is within a second predetermined value range. The first value, $r_1$, and the second value, $r_2$, may be skin color indicators for the particular pixel computed according to:

$$r_1 = \frac{\rho(\lambda_{NIR}) - \rho(\lambda_{GREEN})}{\rho(\lambda_{NIR}) + \rho(\lambda_{GREEN})}$$

$$r_2 = \frac{\rho(\lambda_{GREEN}) - \rho(\lambda_{RED})}{\rho(\lambda_{GREEN}) + \rho(\lambda_{RED})}$$

where $\rho$ denotes a reflectance rate and $\lambda$ denotes a wavelength.

Determining the geometrical features may include determining from the extracted image data for the hand one or more values representative of relative spatial features for the hand.

The relative spatial features may include one or more of, for example, an angle between a first pair of two fingers in the extracted image data for the hand, and/or a relative distance or length for a second pair of fingers in the extracted image data for the hand.

The method may further include determining identity of the person based on the determined geometrical features of the hand.

Determining the identity of the person based on the determined geometrical features of the hand may include comparing values representative of the determined geometrical features of the hand to values in stored records, each record containing respective corresponding record values representative of geometric features determined from image data for respective ones of previously acquired hand images.

Comparing the values representative of the determined geometrical features of the hand to the values in the stored records may include computing a standard deviation for a difference between at least some of the values representative of the determined geometrical features of the hand and corresponding at least some record values representative of geometric features determined from image data for one of the previously acquired hand images, computing an average value for the difference between the at least some of the values representative of the determined geometrical features of the hand and the corresponding at least some of the record values representative of the geometric features determined from the image data for the one of the previously acquired hand images, and determining whether there is a match between the at least some of the values representative of the determined geometrical features of the hand and the corresponding at least some of the records values representative of the geometric features determined from the image data for the one of the previously acquired hand images based on a first comparison of the computed standard deviation to a pre-determined standard deviation threshold, and based on a second comparison of the computed average to a pre-determined average threshold.

Determining whether there is a match between the at least some of the values representative of the determined geometrical features of the hand and the corresponding at least some of the record values representative of the geometric features determined from the image data for the one of the previously acquired hand images may include determining that the at least some of the values representative of the determined geometrical features of the hand match the corresponding at least some of the record values representative of the geometric features determined from the image data for one of the previously acquired hand images when: the computed standard deviation for the difference between the at least some of the values representative of the determined geometrical features of the hand and the corresponding at least some of the record values representative of the geometric features determined from the image data for the one of the previously acquired hand images is less than the standard deviation threshold, and the computed average for the difference between the at least some of the values representative of the determined geometrical features of the hand and the corresponding at least some of the record values representative of the geometric features determined from the image data for the one of the previously acquired hand images is less than the average threshold, or the computed standard deviation for the difference between the at least some of the values representative of the determined geometrical features of the hand and the corresponding at least some of the record values representative of the geometric features determined from the image data for the one of the previously acquired hand images is higher than or equal to the standard deviation threshold, and the computed average for the difference between the at least some of the values representative of the determined geometrical features of the hand and the corresponding at least some of the record values representative of the geometric features determined from the image data for the one of the previously acquired hand images is less than a second average threshold smaller than the average threshold.

The method may further include enabling the person access to a computing device in response to a determination that there is the match between the at least some of the values representative of the determined geometrical features of the hand and the corresponding at least some of the records values representative of the geometric features determined from the image data for the one of the previously acquired hand images.

In some variation, a device is disclosed that includes an RGB image capturing unit, a near infrared (NIR) image capturing unit, one or more processors, and storage media comprising computer instructions. The computer instruction, when executed on the one or more processors, cause operations including capturing with the RGB image capturing unit an RGB image of a hand of a person, capturing with the NIR image capturing device an NIR image of the hand, and determining geometrical features of the hand based on the captured RGB and NIR images.

Embodiments of the device may include at least some of the features described in the present disclosure, including at least some of the features described above in relation to the method.

In some variations, an apparatus is disclosed that includes means for capturing an RGB image of a hand of a person, means for capturing a near infrared (NIR) image of the hand and means for determining geometrical features of the hand based on the captured RGB and NIR images.

Embodiments of the apparatus may include at least some of the features described in the present disclosure, including at least some of the features described above in relation to the method and the device, as well as one or more of the following features.

The means for determining the geometrical features of the hand may include means for extracting image data for the hand based on RGB image data from the captured RGB image and on NIR image data from the captured NIR image, including means for computing a first value and a second value for each of at least one pixel of the captured RGB image based on a respective RGB pixel value for the at least one pixel and on a respective NIR pixel value for a corresponding pixel of the captured NIR image, and means for determining that a particular pixel from the at least one pixel of the captured RGB image corresponds to the hand when the first value for the particular pixel is within a first predetermined value range and the second value is within a second predetermined value range.

The means for determining the geometrical features may include means for determining from the extracted image data for the hand one or more values representative of relative spatial features for the hand, with the relative spatial features including one or more of, for example, an angle between a first pair of two fingers in the extracted image data for the hand, and/or a relative distance or length for a second pair of fingers in the extracted image data for the hand.

The apparatus may further include means for determining identity of the person based on the determined geometrical features of the hand, including means for comparing values representative of the determined geometrical features of the hand to values in stored records, each record containing respective corresponding record values representative of geometric features determined from image data for respective ones of previously acquired hand images.

The means for comparing the values representative of the determined geometrical features of the hand to the values in the stored records may include means for computing a standard deviation for a difference between at least some of the values representative of the determined geometrical features of the hand and corresponding at least some record values representative of geometric features determined from image data for one of the previously acquired hand images, means for computing an average value for the difference between the at least some of the values representative of the determined geometrical features of the hand and the corresponding at least some of the record values representative of the geometric features determined from the image data for the one of the previously acquired hand images, and means for determining whether there is a match between the at least some of the values representative of the determined geometrical features of the hand and the corresponding at least some of the records values representative of the geometric features determined from the image data for the one of the previously acquired hand images based on a first comparison of the computed standard deviation to a pre-determined standard deviation threshold, and based on a second comparison of the computed average to a pre-determined average threshold.

In some variations, a non-transitory processor readable media programmed with computer instructions executable on a processor is disclosed. The computer instructions, when executed, cause operations including capturing an RGB image of a hand of a person, capturing a near infrared (NIR) image of the hand, and determining geometrical features of the hand based on the captured RGB and NIR images.

Embodiments of the processor-readable media may include at least some of the features described in the present disclosure, including at least some of the features described above in relation to the method, the device, and the apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" (or "one or more of A, B, or C") may also include A, AA, AAB, AAA, BB, BCC, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

DETAILED DESCRIPTION

Described herein are implementations in which a pair of RBG-NIR cameras is used to determine geometrical features for a body part (e.g., a hand), and perform a user identification process. Many handheld devices, e.g., smartphones, are generally equipped with an RGB camera, and can be fitted with a Near Infrared (NIR) camera without adding significant physical space requirement or a significant cost increase. An NIR camera is capable of detecting skin regions from noisy background with different contrast, light, and color. In addition, an NIR camera is capable of detecting real skin versus photographed skin, thus enabling implementations of identification processes that protect against attempts by unauthorized users to use a photograph associated with a known authorized user (e.g., a photo of a hand, or some other body part, of that known authorized user). The implementations described herein also include performing a geometrical feature analysis (e.g., of a user's body part, like a hand) based on the images acquired by the RGB and NIR cameras, and use the geometrical features determined from the images as biometric data to determine or verify the identity of the user seeking access. For example, in some embodiments, the image data from the NIR camera is used in conjunction with the image data from the RGB camera to determine the area(s) of the RGB image corresponding to a user's body part, such as a hand, and use the image data corresponding to that body part to perform geometrical features analysis. Testing performed on the procedures and processes described herein have shown accuracy of the procedures/processes to be higher than fingerprint identification procedures/processes.

Thus, described herein are systems, apparatus, devices, methods, computer program products, media, and other implementations, including a method that includes capturing an RGB image of a hand of a person, capturing a near infrared (NIR) image of the hand, and determining geometrical features of the hand based on the captured RGB and NIR images. In some embodiments, the method further includes determining identity of the person based on the determined geometrical features of the hand (or some other body part) of the person. In some embodiments, determining the geometrical features of the hand includes extracting image data for the hand based on RGB image data from the captured RGB image and on NIR image data from the captured NIR image, and may also include determining from the extracted image data one or more values representative of relative spatial features or characteristics for the hand (or for some other body part). For example, the relative spatial features may include one or more of, for example, an angle between a first pair of fingers (or some other body part features) in the extracted image data for the hand, a relative distance for a second pair of fingers in the extracted image data for the hand, a length ratio between length of any two fingers, etc.

Figure 1:
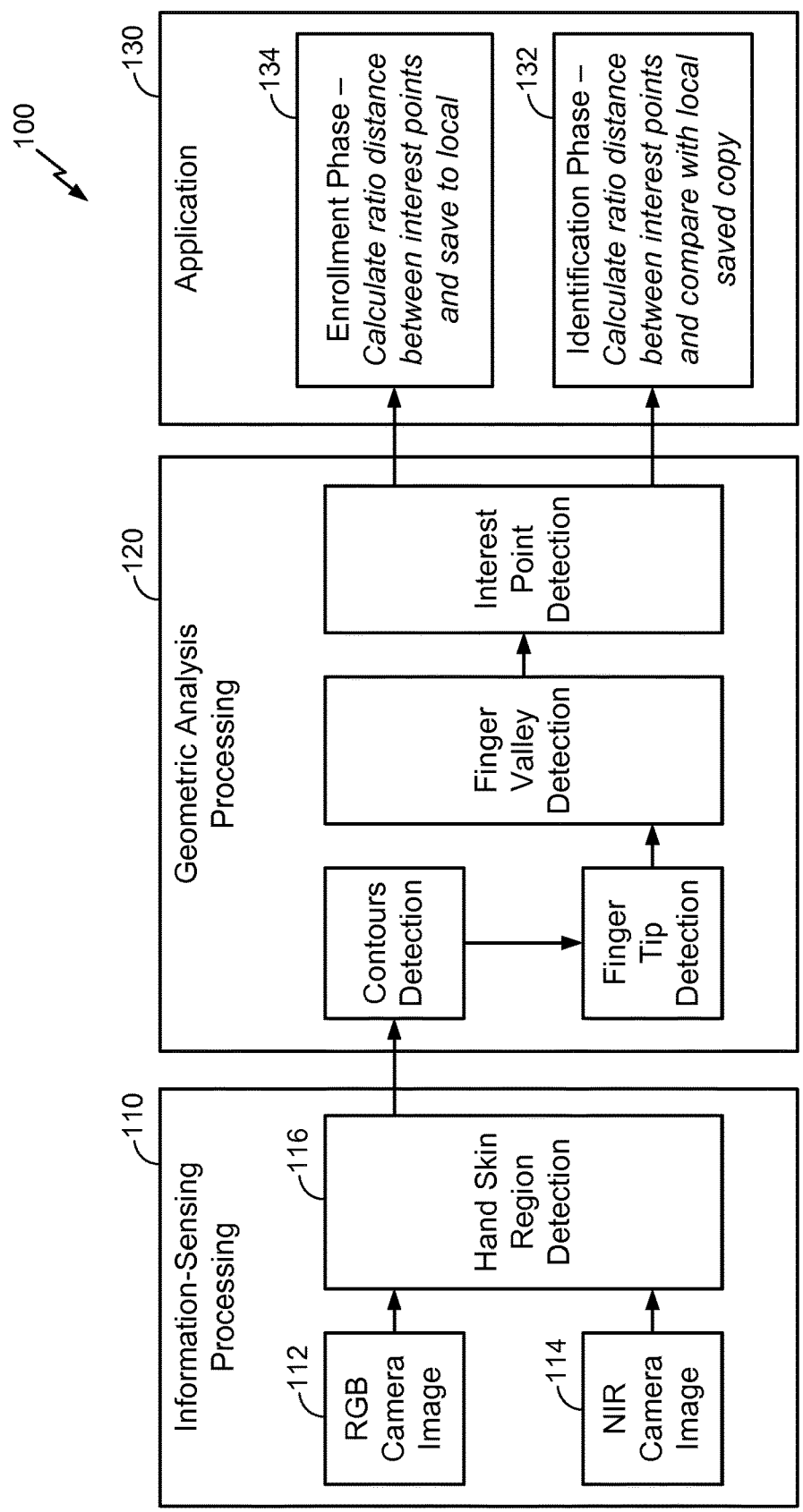
FIG. 1 is a schematic diagram of an example system to perform geometrical feature determination and analysis using an RGB-NIR camera pair.

With reference to FIG. 1, a schematic diagram of an example system 100 to perform geometrical feature determination and analysis (e.g. in order to perform a user identification process) is shown. The schematic diagram illustrates the various processing stages/modules constituting the system 100, which include an information-sensing processing stage/module 110, a geometric analysis processing stage/module 120, and an application processing stage/module 130. The information-sensing processing stage 110 is configured to capture raw image data, e.g., using an RGB image capturing unit and an NIR image capturing unit (shown, for example, in FIG. 6) provided on a handheld device, and provide an RGB image 112 and an NIR image 114 to a region detection unit 116. In some embodiments, the user may be prompted to position his/her hand a certain distance and/or orientation from the cameras. Particularly, the RGB camera and the NIR camera may be placed proximate to each other in some pre-determined orientations requiring positioning of the user's hand at an appropriate location relative to the camera. Based on that pre-determined orientation of the cameras, the user may be prompted to position his/her hand such that the cameras can capture sufficient details of the user's hand to enable the geometric feature determination and analysis procedures described herein. In some embodiments, the user may be prompted to present the hand at some specific pre-determined profile that may be selected (e.g., randomly or pseudorandomly) from a plurality of possible hand profiles (e.g., with the fingers all touching each other, with the fingers wide open and extended, etc.) Use of a number of possible hand profiles can provide another security feature in that a user can pre-register several hand profiles (represented, for example, by corresponding geometric features determined for those profiles) to thus make it more difficult for a rogue user to try and breach security (e.g., because one of several profiles for the same user may be randomly/pseudorandomly selected at the time that the tester's hand images are to be acquired, and the rogue user may not be able to circumvent the security features for all the different hand profiles).

With continued reference to FIG. 1, the region detection unit 116 is configured to determine an area of the RGB captured image that corresponds to a user's actual hand (e.g., rather than to a photograph of a hand that a rogue user might try to use to gain unauthorized access to the device) on which geometrical feature analysis is to be performed. The determination of the area of the RGB image that will be used for geometrical feature determination and analysis is based on the NIR image data and the RGB image data. For example, in some implementations, four (4) channels from the images of 112 and 114 are extracted and the value of each correlated pixel in each channel is used to determine whether the corresponding pixel corresponds to skin tissue. The determination of whether a pixel corresponds to skin or not can be used to produce a binary image where pixels with a value of '1' may represent a skin region and '0' may represent a non-skin region (or vice versa).

The portion of the image data determined to correspond to the user's hand (or some other body part) to be analyzed is provided to the geometric analysis processing stage 120, where image processing is performed to obtain feature points or sets from identifiable features that can be determined from the portion of the image data provided by the processing stage 110. The feature sets may be used by an identification application 132 of the application processing stage 130 to determine if the features extracted or derived using the geometric analysis processing stage match corresponding geometrical features in one of a plurality of profiles that may be stored on the device (e.g., a handheld device, such as a mobile device) implementing the system 100 (or at some remote device). In some embodiments, one or more of the operations performed by the stages 120 and 130 may be performed at a remote device/system (e.g., a remote server in communication with the handheld device that includes the RGB and NIR cameras).

As shown, the application processing stage 130 also includes an enrollment application 134 which is configured to generate geometrical feature profiles from identified feature points or sets determined by the geometric analysis processing stage 120. For example, the enrollment application 134 may be configured to generate and store records including relative spatial features, such as distance/length ratios and angles corresponding to pairs of identifiable features determined from images (e.g., RGB and NIR images) obtained for users that are to be enrolled/registered. The generated geometrical profiles can be stored at the local device on one or more local storage devices (e.g., non-volatile memory), or at a remote device (in embodiments in which some of the operations described herein are performed with the assistance of a remote device/system). In some embodiments, the geometrical feature profiles for registered users may be stored and managed using a database implementation. As noted, in some embodiments, to improve security, a user may register feature profiles for several different hand gestures or orientations, and during the identification phase a tester may be asked to present his/her hand (or a different body part used for identification) in one of the possible gestures/orientations that were registered for a user(s) during the enrollment stage. Subsequently, the identification application 132 determined whether values corresponding to, or representative of, geometrical features of the hand (or other body part) of the current tester match one of the stored profiles.

Figure 2:
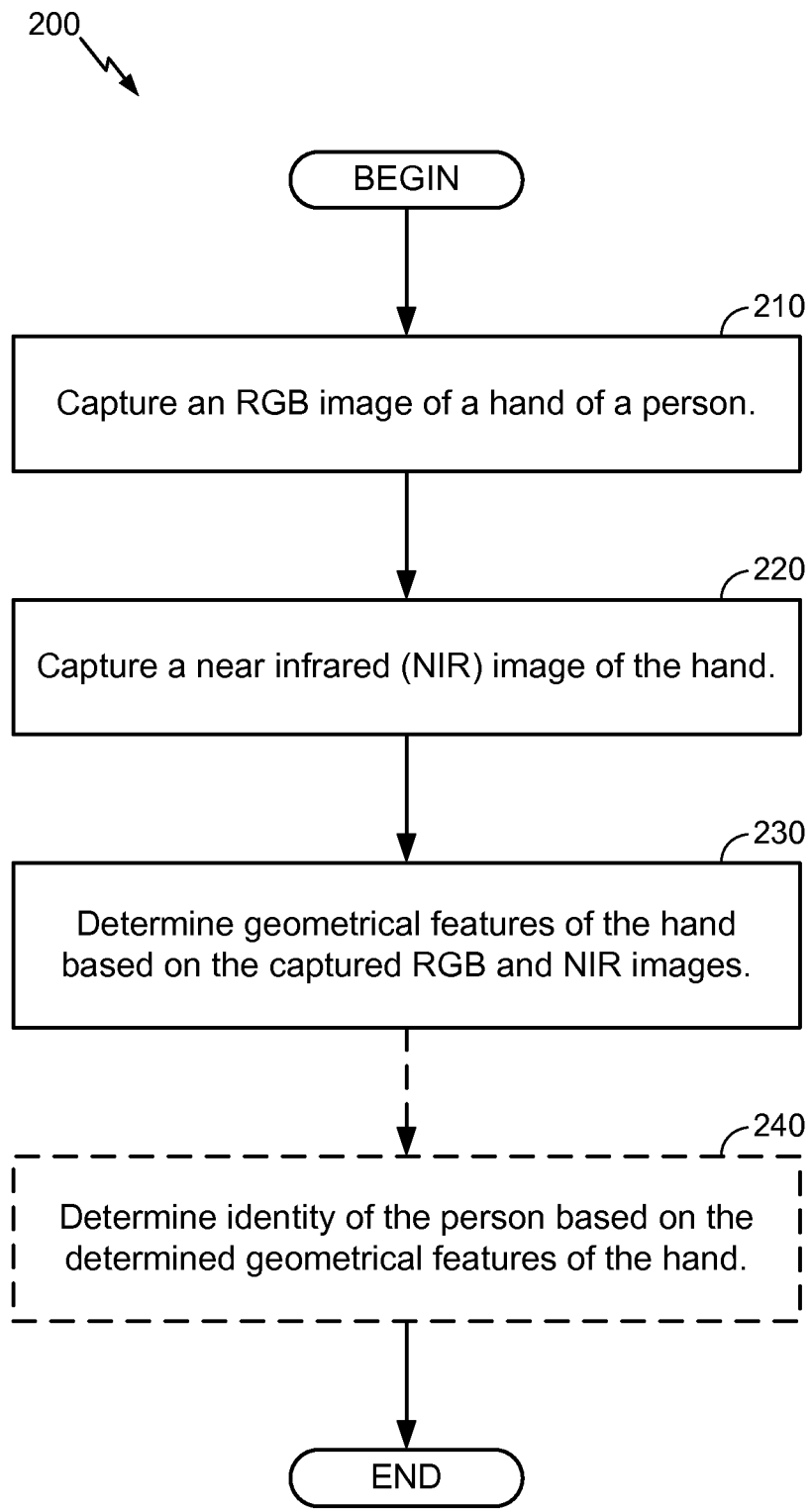
FIG. 2 is a flowchart of an example procedure to determine geometrical features for a user's hand.

With reference now to FIG. 2, a flowchart of an example procedure 200 to determine geometrical features for a person's hand (or some other body part) is shown. The procedure 200 includes capturing 210, by a device's RGB image capturing unit (e.g., a camera, such as a CCD camera) of a device (such as a handheld/portable device), an RGB image of a person's hand (or some other body part). Capturing the RGB image may be performed at the discretion of the user carrying the handheld device, who may activate the image capturing unit. Alternatively and/or additionally, capturing the image may be initiated automatically in response to determining that some pre-determined condition has been met or satisfied. For example, the image capturing unit may be activated: a) in response to detecting the device (e.g., using inertia sensors) being moved in a manner indicating that the person/user is about to take an image of his/her hand, b) at some pre-determined time, c) in response to recognizing the object to be imaged based on visual or audio information received by the handheld device, etc. In some embodiments, a screen display (such as a display 662 of a device 600 shown in FIG. 6) may present an image(s) taken with the device's camera to enable the user to properly point the camera at the desired target object. As noted, in some embodiments, the user may be prompted to present the hand at some specific pre-determined profile, gesture, or orientation, that may be randomly or pseudorandomly selected from a plurality of possible hand profiles, gestures, or orientations.

The procedure 200 further includes capturing 220 a near infrared (NIR) image of the hand for which the RGB image was captured. Capturing the NIR image may be done in response to the same activation sequence or triggers that caused the capturing of the RGB image, except that, in some implementations, the NIR image may be captured slightly later or earlier than the capturing of the RGB image.

In some embodiments, the RGB and NIR cameras may be independent from each other and/or may be configured to capture images substantially simultaneously. The images obtained from two cameras may have an offset distance due to difference of their positions on the device housing the cameras. As noted, in some embodiments, the images may be captured automatically, or in response to activation by the user. When the images are acquired in response to user activation, the user may need to press an activation button once to take pictures from both RGB and NIR cameras. However, in some embodiments, there may still be a small time difference between the time the image from the RGB camera is captured and the time the image from the NIR camera is captured. Even though the time difference may be very small, any slight hand movement will cause an offset between the two images. Therefore, in such embodiments, before commencing processing on the captured images, the images from the two cameras may need to be aligned.

Generally, when the RGB and NIR cameras are placed less than 1 cm away from each other, and the distance between the cameras and the hand (or other body part) is at least 20 cm, the angle difference of the two images is not big enough to cause a significant perspective change. In some embodiments, to align a sample image pair, scale-invariant feature points on the image may be traced (as more particularly described, for example, in "Distinctive image features from scale-invariant keypoints," by D. G. Lowe, published in International Journal of Computer Vision, 60(2):91-110, 2004, the content of which is incorporated by reference herein in its entirety). Once traced, correlated points between two feature point sets are determined, as more particularly described in "Random sample consensus: a paradigm for model fitting with applications to image analysis and automated cartography," by M. A. Fischler and R. C. Bolles, published in Communications of the ACM, 24(6): 381-395, 1981, the content of which is incorporated herein by reference in its entirety. The random sample consensus (RANSAC) mode that may be used is "affine" because the two cameras do not have large perspective angle difference.

With continued reference to FIG. 2, once the RGB and NIR images of the hand have been captured, geometrical features of the hand are determined 230 based on the captured RGB and NIR images. Geometrical feature determination performed on a user's hand includes processes to extract image data corresponding to the user's hand (or other body part) region, and to determine geometrical features (e.g., length or width of fingers, in pixels, as determined from the image data) corresponding to the extracted portion of image data. In some embodiments, relative spatial features/characteristics (e.g., length ratio between any two fingers) associated with the user's hand (or some other body part) may be computed, and those computed values may be used to determine whether a match exists with stored records of previously computed geometrical features (for previously registered/enrolled users).

To extract relevant image data from the captured images (from which the geometrical features are determined), a challenge that needs to be addressed is that the captured images often include unstable image and color changes caused by environmental light instability. In order to capture skin-based objects in an image, traditional YCrCb color thresholding technique use broad thresholds, which causes color features from other objects (i.e., not only skin-based objects) to also be detected in the process. An NIR camera, on the other hand, can distinguish skin pixels from pixels corresponding to other objects, or from the background, by analyzing the liveness of the pixel color using both RGB and NIR images. Use of NIR imaging also enables determining whether an image object correspond to real human tissue rather than to a color photograph of such an object.

To achieve skin region detection from captured images, transformation of spectral reflectance and skin detection with NIR images may be used. Human skin, which includes melanin that has low optical absorption properties in the NIR spectrum range, causes reflection of NIR radiation. Thus, to determine portions of the image data that correspond to human skin, skin color indicator values $r_1$ and $r_2$ are first computed for at least some (and generally all) of the pixels in the RGB and NIR images according to, for example:

$$r_1 = \frac{\rho(\lambda_{NIR}) - \rho(\lambda_{GREEN})}{\rho(\lambda_{NIR}) + \rho(\lambda_{GREEN})} \quad (1)$$

$$r_2 = \frac{\rho(\lambda_{GREEN}) - \rho(\lambda_{RED})}{\rho(\lambda_{GREEN}) + \rho(\lambda_{RED})} \quad (2)$$

where $\rho$ denotes the reflectance rate (for a particular pixel) and $\lambda$ denotes the wavelength for a particular pixel. Other formulations for deriving skin color indicators may also be used.

A pixel i is then determined to correspond to a skin region when:

LowerBound$_{NIR,G}$<$r_1$<UpperBound$_{NIR,G}$; and

LowerBound$_{G,R}$<$r_2$<UpperBound$_{G,R}$ for some predetermined values of LowerBound$_{NIR,G}$, UpperBound$_{NIR,G}$, LowerBound$_{G,R}$, and UpperBound$_{G,R}$ (in some embodiments, the threshold values may be determined based, at least in part, on the illumination's spectrum composition and on the sensors' quantum efficiency).

Having determined the portion/area of the image data (e.g., of the RGB image) corresponding to an actual physical body part, that portion of the image data is then analyzed (e.g., using the geometric analysis processing stage 120 shown in FIG. 1). One challenge for geometrical feature determination from images captured by a handheld devices' cameras is that the images used in the enrollment phase and those used during the identification phase may have different image scales. The 'scale-change' problem can be resolved by determining relative spatial features/characteristics from the extracted data, e.g., computing ratios corresponding to physical dimensions of features (such as length ratio), rather than determining and using absolute computed physical dimensions of such features to identify users.

The body part geometrical feature determination and analysis begins, in some embodiments, with contour detection. The contour detection gives not only the contour of the hand region, but also provides the hulls over the contour, which indicate the position of certain prominent points (e.g., finger tips, when the body part analyzed is a hand). In the example of a user's hand, convexes on the contours can also be detected, indicating the valley between every two finger tips next to each other. In addition to these, other feature points may be calculated to determine, for example, the start and end points of finger widths.

Figure 3:
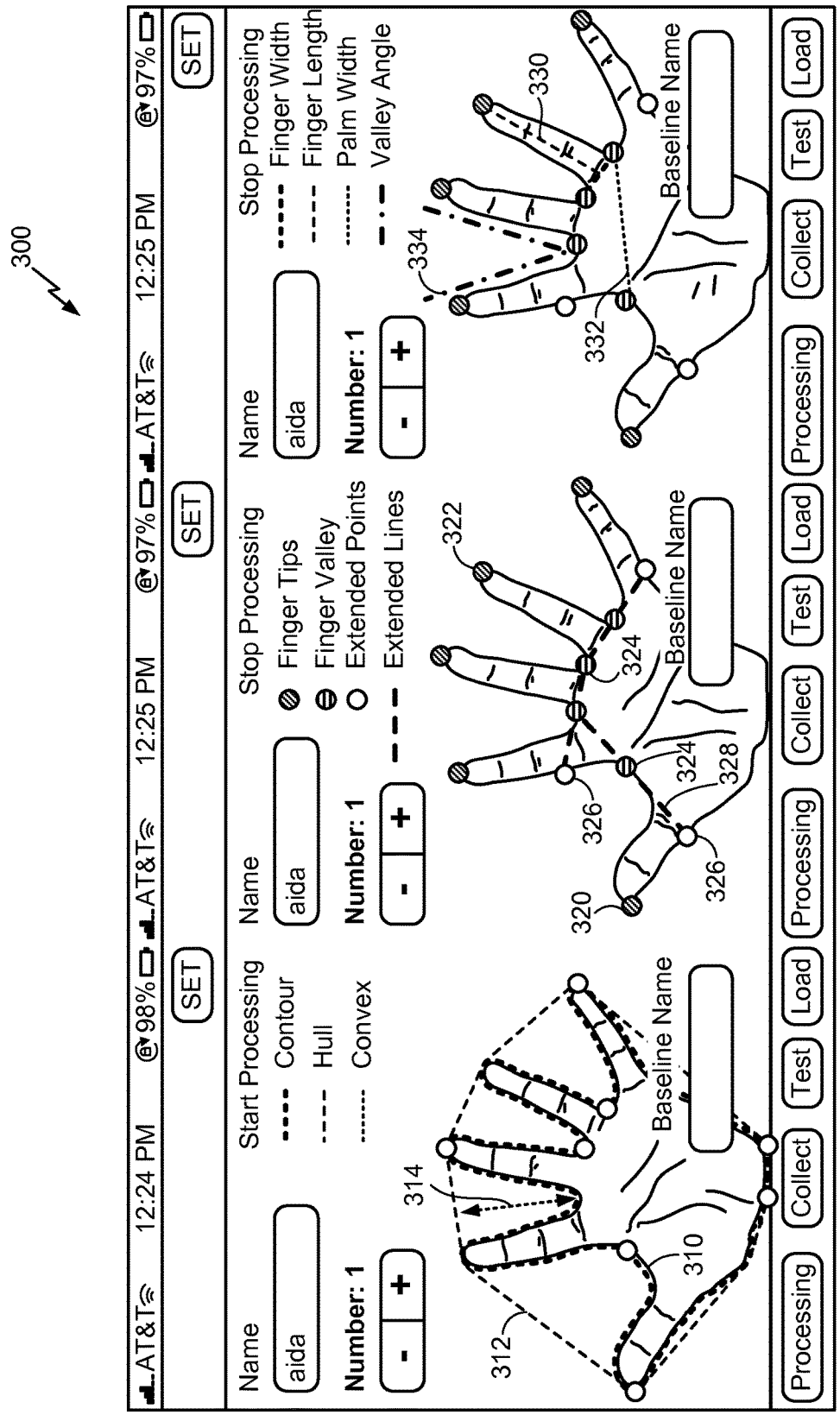
FIG. 3 is an example screenshot illustrating various processing operations to extract geometrical features for a particular user's hand.

FIG. 3 is an example screenshot 300 illustrating various processing operations to extract geometric features for a particular user's hand. In hand image '(a)' of FIG. 3, contours 310 of the user's hand are detected and a hull 312 (i.e., a polygon encompassing the contours 310) is determined from the contours 310. A convex line 314 indicates a valley defined by two fingers of the user's hand. In hand image '(b)', feature points of the hand, for example finger tips 320 and 322, are detected from the previously determined hull 312 (shown in hand image '(a)'), and two valley points 324 are detected from the previously determined convexes. Additionally, extended points 326, which correspond to intersection points of extended lines (such as extended line 328) and contours of the hand, can be derived from the finger tips, valleys and contours (e.g., the identified finger tips, valleys, and contours can be used to determine or define the extended lines). Using the identified/derived feature points illustrated in hand images '(a)' and '(b)', spatial features such as, for example, finger width (not shown), finger length (such as finger length 330), palm width (such as palm width 332), valley angle (such as valley angle 334), and other types of spatial features, are derived.

In some embodiments, and as further shown in FIG. 2, the procedure 200 may further include determining 240 identity of the person/user based on the determined geometrical features of the hand. As noted, the spatial features identified from the captured images of the hand (such as the features illustrated in FIG. 3) are generally provided in terms of pixel-based dimensions (e.g., the finger width is expressed as a number of pixels, as determined from the image, constituting the width of the finger). However, every time that a user takes an image of his/her hand, the distances between hand and camera's perspective, and the hand's position on the image are not exactly the same. Therefore, the feature points are not entirely reliable to identify a user based on those features. Thus, instead of directly using the feature points to enable user identification, relative spatial features corresponding to the body part analyzed may be computed and used to perform identification processing. For example, the relative lengths (e.g., ratio lengths/distances) and angles between the various identified feature points may be utilized for identification. In some embodiments, there are four categories of features that may be used when determining relative spatial features, including: 1) finger length, 2) finger width, 3) palm width, and 4) valley angles between fingers. In some embodiments, relative length features may be computed by dividing the apparent size (e.g., measured in pixels) of various identifiable features by the apparent size of some particular designated feature appearing in the image data. For example, the apparent size (e.g., in pixels) for such various identifiable features (e.g., finger length for the various fingers, finger width for various fingers, palm width, etc.) may all be divided by the apparent size, in the image data, of the ring finger width (and/or some other selected feature) to derive the relative spatial features. Those derived spatial features can then be compared to similarly derived stored features of registered users.

Thus, relative spatial features may include one or more of, for example, an angle between a first pair of two fingers in the extracted image data for the hand, and/or a relative distance or length for a second pair of fingers in the extracted image data for the hand. For example, the relative spatial features computed may include a ratio of the length of one finger and another finger (e.g., computed as a quotient of the length, in pixels, of the fingers), as well as other ratios between the identified spatial features of the hand. As for valley angles, because the angles between fingers may vary depending on the extent to which a user stretches his/her hand, when using this feature category, the user may be asked to stretch or contort his/her hand in some particular fashion. Once derived, the geometrical features serve as inputs for identification processing.

In order to use geometrical features for identification purposes, in some implementations, an authorized user's geometrical features (e.g., data associated with the actual identified features of the body part analyzed and/or the relative spatial characteristics corresponding to those actual features) are used (e.g., by a module such as the application processing stage 130 of FIG. 1) to first enroll the authorized user in order to subsequently determine if a current user's geometrical features match the enrolled user's features (and thus if the current user is authorized to gain access to the device or to some other computing device). In the enrollment phase (e.g., implemented by, for example, the enrollment application 134), an authorized user's baseline hand feature sets (or feature sets for another body part of the user) are registered for future identification processing uses. An identification phase, implemented, for example, by the identification application 132 depicted in FIG. 1, will subsequently compare a current tester's hand feature set values to previously registered baseline profile(s), and determine whether they match one of the previously registered baseline profiles.

Thus, when a user wants to unlock his device, or use certain applications to access personal information, the identification application is triggered. Initially, the user will be prompted to point the cameras to his/her hand (for example) and take an image of the hand (images of the hand, or other body part, will be captured by both an RGB camera and an NIR camera). Then a feature set with values representative of the hand's geometrical features are derived from the hand image extracted using the raw RGB and NIR images. Subsequently, in some embodiments, and as will be described in greater details below, a decision tree is applied to the feature set to determine whether the user is to be allowed access to the device or not. If the feature set derived for the current tester matches one of the baseline profile feature sets, a determination is made that the current tester is the same as a previously registered user.

When performing user identification, several problems may arise, including: 1) obtaining an invalid image that cannot be used to extract useful feature points, 2) having an incomplete extracted feature set caused by unstable detection environment, 3) having small perspective change between the body part and the device's camera causing the features to be unmatchable. To handle the situation in which an invalid image feature point extraction was obtained, the extracted feature points may be checked by feature point positioning rules. For example, the five finger tips and four valleys of an imaged hand should be in their correct spatial order in terms of image pixel coordinate from left to right.

To address the issues of an incomplete extracted feature set, only shared features may be extracted for identification. For example, in some situations, not all the features can be extracted from an image of the tester's hand (due to the instability of the use of mobile device, for example). Thus, there may be a feature(s) missing from a tester's feature set that is not missing from a baseline registered feature set. In those situations, a feature subset, comprising features that are included in both feature sets may be selected as a shared feature set on which further processing will be applied. Assume, for example, that $F0_i$ is the feature sets of a registered user, and that $F1_i$ indicates the feature set of a tester, where $i \in [1 \ldots 4]$ for the four feature categories or groups that are to be investigated (more or fewer feature categories or groups may be determined and/or used). Missing values in each feature set are considered as invalid, and thus resultant sets $F0V_i$, $F1V_i$ are generated that contain data representative of valid features in $F0_i$, $F1_i$. $FS_i$, in turn, corresponds to the set containing data representative of the shared valid features for $F0V_i$ and $F1V_i$.

To weed out the artifacts introduced by the small perspective angle between the tester's body part and the device's cameras, computed standard deviation and average values for the difference between ratio distances in the feature set may be used (i.e., the difference between a feature computed from the current image data, and a corresponding stored feature for one of the registered users). Particularly, when the difference is caused by difference of geometry for different users' hands, the average and standard deviation are both expected to be high. In contrast, when the difference is caused as a result of position difference of the same hand (i.e., for a particular user), even if the computed standard deviation is high (which may have been caused by one bad measure) the computed average will generally not be high, thus indicating the presence of a potential image artifact.

Thus, features in various categories or groups (e.g., finger length, finger width, palm width, and angle between fingers) are computed from an image of a current user's hand (or some other body part), and are compared to corresponding features previously obtained for enrolled/registered users. Results from the comparison of the current user's feature set to registered feature sets are used to determine an identification result (and thus determine if the current user is an authorized user).

Figure 4:
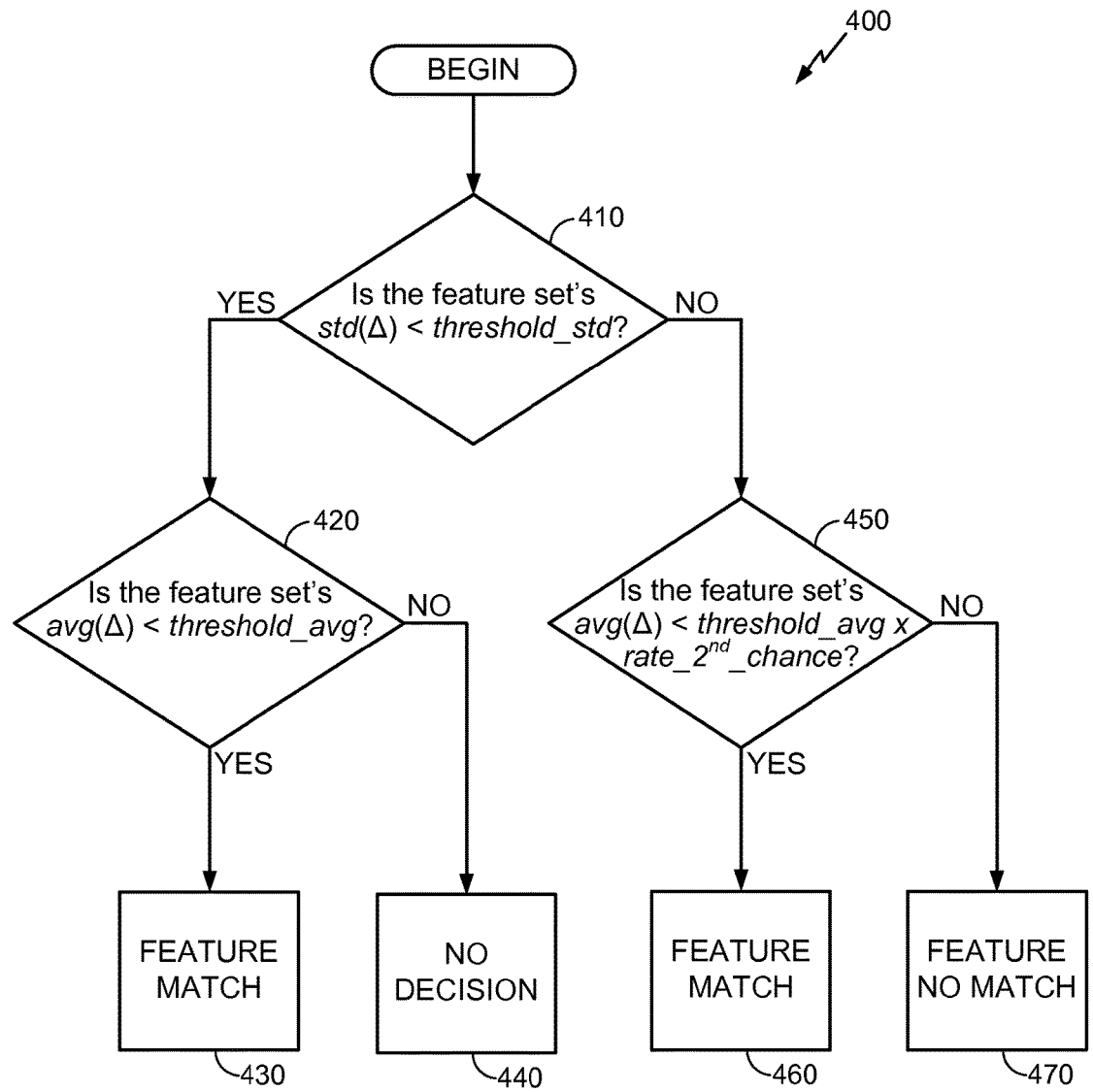
FIG. 4 is an a diagram of an example decision tree procedure to determine whether a feature set extracted from a current image matches a baseline feature set.

Particularly, when a request for identification processing with a current user's hand is received, $std(\Delta)$ and $avg(\Delta)$ values between a baseline features set of a registered user's hand and the feature set for the current user's hand are computed as follows:

$$std(\Delta_i) = std(F0_i'[1 \ldots NF] - F1_i'[1 \ldots NF]) \quad (3)$$

$$avg(\Delta_i) = avg(F0_i'[1 \ldots NF] - F1_i'[1 \ldots NF]) \quad (4)$$

where $F0_i'$ and $F1_i'$ (the valid features in a feature set) are determined as follows:

$F0_i' = \{d_{index} \in F0_i, index \in FS_i\}$ $F1_i' = \{d_{index} \in F1_i, index \in FS_i\}$ Processing applied to the computed values of std($\Delta_i$) and avg($\Delta_i$) may then be used to determine whether the hand features from the hand image for the current user (i.e., the tester) matches a particular baseline feature set for a particular registered (enrolled) user. For example, in some embodiments, a decision tree procedure is performed using the computed values of std($\Delta_i$) and avg($\Delta_i$) to determine whether the features from the hand image obtained for the current user match the body part features for a particular registered user. FIG. 4 is a diagram of an example decision tree procedure 400 that may be performed to determine if a feature set extracted from the hand image of the current user (the tester) matches a particular one of stored one or more baseline feature sets. As shown, a determination is first made 410 whether a computed standard deviation (e.g., derived according to Equation 3) for the difference between feature values for the current image and the corresponding feature values (e.g., valid features shared with the feature set of the tester's hand) for a particular registered user is lower than a pre-determined threshold (threshold_std). If it is (i.e., the computed standard deviation for the difference between the feature values computed for the current image and the corresponding feature values for the particular registered user is less than the pre-determined threshold), a determination is made 420 whether the average difference between the feature values for the current image and the corresponding feature values for the particular registered user (e.g., derived according to Equation 4) is lower than some pre-determined threshold threshold_avg. If it is, the features sets of the current image (for the current user) and for the particular registered user are determined 430 to be a match. However, if the determination made at 420 is that the average difference between the feature values for the current image and the corresponding feature values for the particular registered user is not less than threshold_avg, a "no decision" determination is made 440.

If it is determined (at 410) that the standard deviation for the difference between feature values derived for the current image and the corresponding values for the particular registered user is higher than or equal to threshold_std, the following two scenarios may have occurred: 1) the current user (tester) has one inaccurate feature reading in the derived feature set, but nevertheless the tester is a registered user, or 2) the tester is not a registered user. For the first case, there should be a good match between the remaining features (i.e., excluding the feature for which there was an inaccurate reading) and the baseline features for a "match" determination to be made. In some embodiments, the remaining features for the current tester are deemed to constitute a good match to the corresponding remaining features for a particular baseline feature set of a particular registered user if there is a low average difference value derived from the difference between the values for the remaining features for the current image and the values of the corresponding features of the baseline profile used (i.e., the two sets closely match). Thus, the procedure 400 may include, in such embodiments, determining 450 whether the average difference between the feature values derived from the current image and the corresponding values for the particular registered user is less than some other pre-determined threshold value computed as threshold_avg×rate_$2^{nd}$_chance (where the rate_$2^{nd}$_chance value is a pre-determined value). A decision of a "match" is made 460 if the average difference computation is determined to be less than the second threshold value (i.e., less than threshold_avg×rate_$2^{nd}$_chance). The second threshold is generally smaller than the threshold_avg threshold value, to reflect the fact that a smaller difference between the current geometrical features and the pre-determined recorded features is required for a determination that the current features match the recorded feature values (for the baseline feature set considered). Otherwise, a decision of a "no match" is made 470.

In some embodiments, the decision tree, such as the example decision tree procedure 400 of FIG. 4, is applied to each single category of the feature sets. Therefore, if one feature category cannot match due, for example, to perspective angle change, there are still other categories to enable making a decision. For example, in some embodiments, each feature category/group may be scored as follows:

$$\text{SCORE} = \begin{cases} -1 & \text{No Match} \\ 0 & \text{Unknown} \\ 1 & \text{Match} \end{cases}$$

When a result score from the decision tree is obtained for the feature groups in a set (e.g., four or more feature groups), the results are summed up. If, in some embodiments, the score sum exceeds a value corresponding to half the number of categories/groups (e.g., exceeds 2 when there are four categories), then, under those circumstances, a determination is made that the feature set determined for the imaged hand (or some other body part) of the current tester matches a feature set profile for a registered user.

Figure 5:
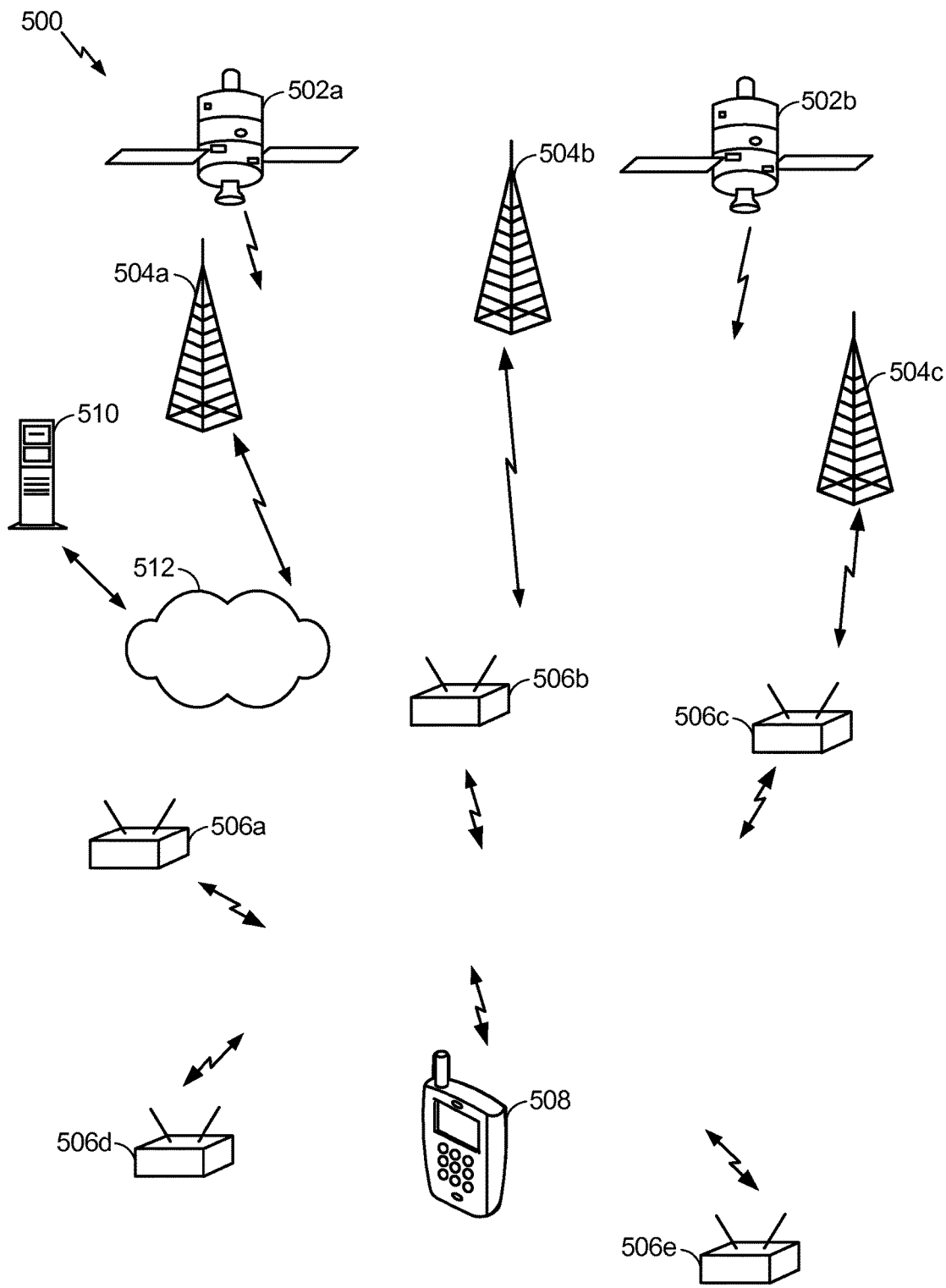
FIG. 5 is a schematic diagram of an example operating environment for a mobile device.

With reference now to FIG. 5, a schematic diagram of an example operating environment 500 for a handheld device, such as a mobile device 508, is shown. The mobile device (also referred to as a wireless device or as a mobile station) 508 may be similar to a device used to implement the system 100 depicted in FIG. 1, and may be configured to operate and interact with multiple types of other communication systems/devices, including local area network devices (or nodes), such as WLAN for indoor communication, femtocells, Bluetooth® wireless technology-based transceivers, other types of indoor communication network nodes, wide area wireless network nodes, satellite communication systems, etc., and as such the mobile device 508 may include one or more interfaces to communicate with the various types of communications systems. As used herein, communication system/devices with which the mobile device 508 may communicate are also referred to as access points (AP's). The mobile device 508 may also be configured to determine or derive geometrical features for a body part (e.g., hand) of a user based on images captured using an RGB and NIR image capturing units, and determine whether the user is authorized to use the mobile device 508 (or use some other device or system the user is seeking to gain access to) based on the determined geometrical features. In some embodiments, at least some of the processing (e.g., determining geometrical features for a body part appearing in captured RGB and NIR images, determining whether a user is authorized to use the device based on determined geometrical features, etc.) may be performed at a remote server (e.g., a server 510 depicted in FIG. 5) with which the device 508 may establish a communication link (e.g., via one or more of the communication nodes illustrated in FIG. 5, as more particularly described below).

As noted, the operating environment 500 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 5, the operating environment 500 may include Local Area Network Wireless Access Points (LAN-WAPs) 506a-e that may be used for wireless voice and/or data communication with the mobile device 508. The LAN-WAPs 506a-e may also be utilized, in some embodiments, as independents sources of position data, e.g., through implementation of trilateration-based procedures based, for example, on time of arrival techniques. The LAN-WAPs 506a-e can be part of a Wireless Local Area Network (WLAN), which may operate in buildings and perform communications over smaller geographic regions than a WWAN. Additionally, in some embodiments, the LAN-WAPs 506a-e could also be pico or femto cells that are part of a WWAN network. In some embodiments, the LAN-WAPs 506a-e may be part of, for example, WiFi networks (802.11x), cellular piconets and/or femtocells, Bluetooth® wireless technology Networks, etc. The LAN-WAPs 506a-e can also form part of an indoor positioning system. Although five (5) LAN-WAP access points are depicted in FIG. 5, any number of such LAN-WAP's may be used, and, in some embodiments, the operating environment 500 may include no LAN-WAPs access points at all, or may include a single LAN-WAP access point. Furthermore, each of the LAN-WAPs 506a-e depicted in FIG. 5 may be a moveable node, or may be otherwise capable of being relocated.

As further shown in FIG. 5, the operating environment 500 may also include, in some embodiments, a plurality of one or more types Wide Area Network Wireless Access Points (WAN-WAPs) 504a-c, which may be used for wireless voice and/or data communication, and may also serve as another source of independent information through which the mobile device 508 may determine its position/location. The WAN-WAPs 504a-c may be part of wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 5. Typically, each WAN-WAPs 504a-504c within the WWAN may operate from fixed positions, and provide network coverage over large metropolitan and/or regional areas. Although three (3) WAN-WAPs are depicted in FIG. 5, any number of such WAN-WAPs may be used. In some embodiments, the operating environment 500 may include no WAN-WAPs at all, or may include a single WAN-WAP. Additionally, each of the WAN-WAPs 504a-c depicted in FIG. 5 may be a moveable node, or may otherwise be capable of being relocated.

Communication to and from the mobile device 508 (to exchange data, enable position determination of the device 508, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth® wireless technology network, an IEEE 802.15x, or some other type of network. The techniques described herein may also be used for any combination of WWAN, WLAN and/or WPAN.

When deriving position using the WWAN nodes, the mobile device 508 may utilize time of arrival techniques, optionally with the assistance of a positioning server (which may be implemented on the same or different server as the server 510 of FIG. 5) and a network 512. Thus, the mobile device 508 may be configured to determine position information using WAN-WAPs 504a-c which may include WAPs of different types (e.g., cellular base stations, WiMax base stations, etc.) In such an operating environment, the mobile device 508 may be able to use the signals from the different types of WAN-WAP to improve accuracy. The positioning server may communicate with the mobile device 508 through the network 512.

In some embodiments, and as further depicted in FIG. 5, the mobile device 508 may also be configured to at least receive information from a Satellite Positioning System (SPS) 502a-b, which may be used as an independent source of position information for the mobile device 508. The mobile device 508 may thus include one or more dedicated SPS receivers specifically designed to receive signals for deriving geo-location information from the SPS satellites. Thus, in some embodiments, the mobile device 508 may communicate with any one or a combination of the SPS satellites 502a-b, the WAN-WAPs 504a-c, and/or the LAN-WAPs 506a-e. In some embodiments, each of the aforementioned systems can provide an independent information estimate of the position for the mobile device 508 using different techniques. In some embodiments, the mobile device may combine the solutions derived from each of the different types of access points to improve the accuracy of the position data.

In embodiments in which the mobile device 508 can receive satellite signals, the mobile device may utilize a receiver (e.g., a GNSS receiver) specifically implemented for use with the SPS to extract position data from a plurality of signals transmitted by SPS satellites 502a-b. Transmitted satellite signals may include, for example, signals marked with a repeating pseudo-random noise (PN) code of a set number of chips and may be located on ground based control stations, user equipment and/or space vehicles. The techniques provided herein may be applied to or otherwise enabled for use in various systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multifunctional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, the procedures described herein, including procedures to determine a device's motion/movement, detect variations in features of an object appearing in one or more captured images based, at least in part, on the determined device motion, etc., may be performed by devices that do not have wireless functionality (e.g., functionality to wirelessly communicate with other remote devices).

Figure 6:
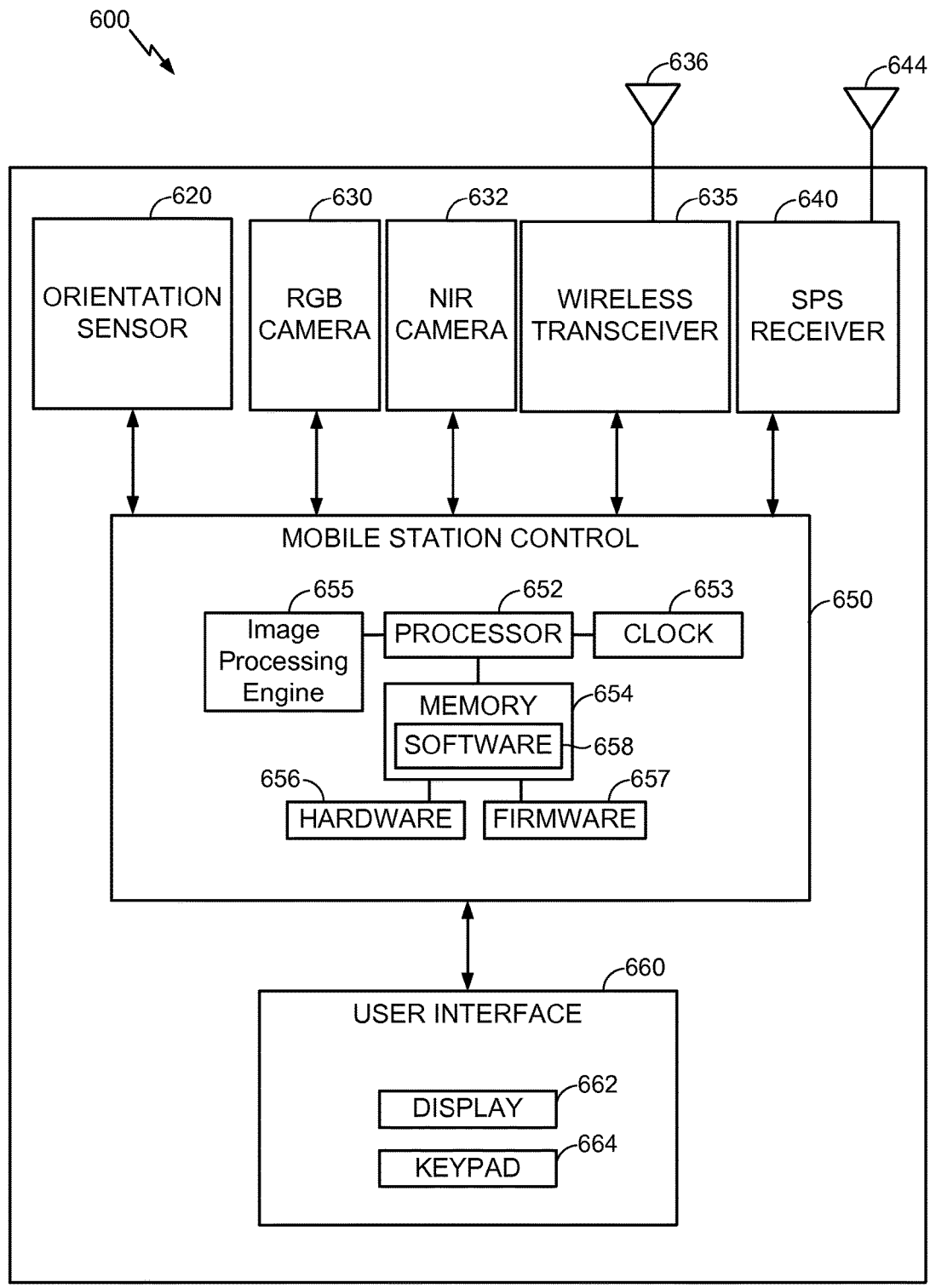
FIG. 6 is a block diagram of an example mobile device.

With reference now to FIG. 6, a block diagram of a mobile device 600, which may be similar to a device used to implement the system 100 of FIG. 1, or to the device 508 described in relation to FIG. 5, is shown. As illustrated in FIG. 6, the mobile device 600 may include at least one orientation sensor (also referred to as spatial or inertial sensor) 620, which may be, e.g., a magnetometer, an accelerometer (e.g., a 3D accelerometer), a gyroscopes, etc. Although only one orientation sensor is depicted, additional sensors may be included with the device 600. The mobile device further includes an RGB image capturing device, such as a camera 630 (e.g., a charge-coupled device (CCD)-type camera, CMOS-type camera, etc.), which may produce still or moving images (e.g., a video sequence) that may be displayed on a user interface device, such as a display or a screen. The mobile device also includes a near infrared (NIR) image capturing device, such as an NIR camera 632, to capture still or moving NIR images of the object(s) whose image is also captured by the RGB camera 630.

The mobile device 600 may include a receiver 640, such as a satellite positioning system (SPS) receiver that receives signals from an SPS satellites (such as the satellites 502a-b of FIG. 5) via an antenna 644. The mobile device 600 may also include a wireless transceiver 635, which may be, e.g., a cellular modem or a wireless network radio receiver/transmitter configured to send and receive communications to and from one or more wireless access points (such as any of the LAN-WAPs 506a-e and/or the WAN-WAPs 504a-c of FIG. 5), or with any other type of network node configured for wireless/cellular communication. Communication to and from the wireless transceiver may be enabled via a dedicated antenna 636, via the antenna 644, or via some other antenna. In some embodiments, the mobile device 600 may include separate transceivers that serve as the cellular modem and the wireless network radio receivers/transmitters.

The at least one orientation sensor 620, the cameras 630 and 632, the SPS receiver 640, and the wireless transceiver 635 are connected to, and communicate with, a mobile device controller 650. The controller 650 is configured to, for example, accept and process data from the at least one orientation sensor 620, the cameras 630 and 632, the SPS receiver 640, and/or the wireless transceiver 635, and to control the operation of the various on-board units/modules of the device 600, as well as the general operation of the mobile device 600. For example, the controller 650 is configured to process one or more images captured by the cameras 630 and 632, identify based on the captured RGB and NIR images regions corresponding to a user's hand (or some other body part), determine geometrical features (e.g., determine apparent dimensions of identifiable features, such as a hand's fingers), and/or determine relative spatial features or characteristics for identifiable features of the hand. The controller may also be configured, in some embodiments, to determine if the determined geometrical feature match pre-recorded features of previously registered (e.g., enrolled) users, and thus configured to determine if the current user is an authorized user that may be granted access to the mobile device (or to some remote device).

The controller 650 may include, in some implementations, a processor 652 and associated memory 654, a clock 653, hardware 656, software 658, and firmware 657. The mobile device controller 650 may further include, in some embodiments, a dedicated image processing engine 655, which is illustrated separately from processor 652 for clarity, but which may constitute part of the processor 652. The image processing engine 655 is configured to process images and/or perform at least some of the operations of the procedures described herein.

Figure 7:
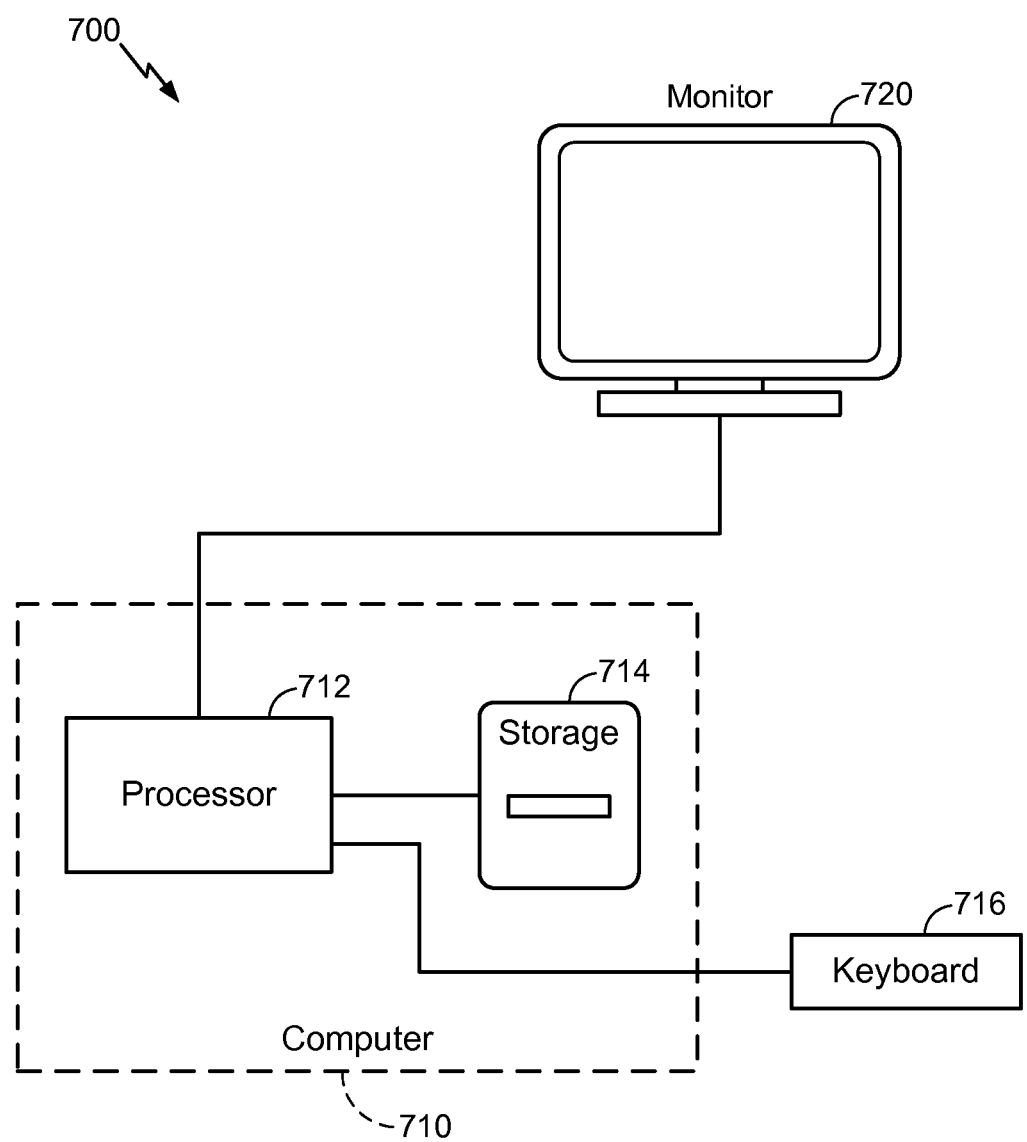
FIG. 7 is a schematic diagram of an example computing system.

With reference to FIG. 7, a schematic diagram of an example computing system 700 is shown. One or more of the devices, servers, and/or systems described herein (e.g., anyone of the devices, access points, or server shown in FIGS. 1 and 5) may be realized, at least partly, using part or all of a computing system that may be similar to the example computing system 700.

The computing system 700 includes a processor-based device 710 such as a personal computer, a specialized computing device, and so forth, that typically includes a central processor unit 712. In addition to the CPU 712, the system 700 includes main memory, cache memory and bus interface circuits (not shown). The processor-based device 710 may include a mass storage device 714, such as a hard drive and/or a flash drive associated with the computer system. The computing system 700 may further include a keyboard 716, or keypad, and a monitor 720, e.g., a CRT (cathode ray tube) or LCD (liquid crystal display) monitor, that may be placed where a user can access them (e.g., a mobile device's screen).

The processor-based device 710 is configured to facilitate, for example, the implementation of the procedures described herein (in some embodiments, some of the procedures' operations may be performed at a first device, such as a mobile device including an RGB and NIR cameras, while other of the procedures' operations may be performed at a system in communication with the mobile device). The mass storage device 714 may thus include a computer program product that when executed on the processor-based device 710 causes the processor-based device to perform operations to facilitate the implementation of the procedures described herein. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 700. Other modules that may be included with the processor-based device 710 are speakers, a sound card, a pointing device, e.g., a mouse or a trackball, by which the user can provide input to the computing system 700. The processor-based device 710 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
    capturing an RGB image of a hand of a person;
    capturing a near infrared (NIR) image of the hand;
    producing a resultant binary image from the RGB image and the NIR image using reflectance values derived from pixels of the RGB image and corresponding pixels of the NIR image, the resultant binary image comprising a first binary pixel value for skin tissue areas in the RGB image and the NIR image corresponding to the hand of the person, the resultant binary image further comprising a second binary pixel value for non-skin areas in the RGB image and the NIR image, wherein the first binary pixel value is determined for a pixel of the binary image when a first value associated with the pixel is within a first predetermined value range and when a second value associated with the pixel is within a second predetermined value range, the first value being determined based on a comparison between a reflectance value of a color component of a pixel of the RGB image and a reflectance value of a corresponding pixel of the NIR image, and the second value being determined based on a comparison between a reflectance value of a first color component of the pixel and a reflectance value of a second color component of the pixel;

determining, from the resultant binary image with the extracted hand image data corresponding to the skin tissue of the hand of the person, geometrical features of the hand; and determining whether the person is authorized to access a device based on the geometric features of the hand extracted from the resultant binary image.

2. The method of claim 1, further comprising:
aligning the captured RGB image with the captured NIR image.

3. The method of claim 1, wherein the first value, $r_1$, and the second value, $r_2$, are skin color indicators for the particular pixel that are computed according to:

$$r_1 = \frac{\rho(\lambda_{NIR}) - \rho(\lambda\rho_{GREEN})}{\rho(\lambda_{NIR}) + \rho(\lambda_{GREEN})}$$

$$r_2 = \frac{\rho(\lambda_{GREEN}) - \rho(\lambda_{RED})}{\rho(\lambda_{GREEN}) + \rho(\lambda_{RED})}$$

where $\rho$ denotes a reflectance rate and $\lambda$ denotes a wavelength.

4. The method of claim 1, wherein determining the geometrical features comprises:
determining from the resultant binary image one or more values representative of relative spatial features for the hand.

5. The method of claim 4, wherein the relative spatial features comprise one or more of: an angle between a first pair of two fingers in the resultant binary image comprising the extracted hand image data, or a relative distance or length for a second pair of fingers in the resultant binary image comprising the extracted hand image data.

6. The method of claim 1, further comprising:
determining an identity of the person based on the determined geometrical features of the hand.

7. The method of claim 1, wherein determining whether the person is authorized to access the device comprises:
comparing values representative of the determined geometrical features of the hand to values in stored records, each record containing respective corresponding record values representative of geometric features determined from image data for respective ones of previously acquired RGB and NIR images.

8. The method of claim 7, wherein comparing the values representative of the determined geometrical features of the hand to the values in the stored records comprises:
computing a standard deviation for a difference between at least some of the values representative of the determined geometrical features of the hand and corresponding at least some record values representative of geometric features determined from the image data for one of the previously acquired RGB and NIR images;
computing an average value for the difference between the at least some of the values representative of the determined geometrical features of the hand and the corresponding at least some of the record values representative of the geometric features determined from the image data for the one of the previously acquired RGB and NIR images; and
determining whether there is a match between the at least some of the values representative of the determined geometrical features of the hand and the corresponding at least some of the records values representative of the geometric features determined from the image data for the one of the previously acquired RGB and NIR images based on a first comparison of the computed standard deviation to a pre-determined standard deviation threshold, and based on a second comparison of the computed average to a pre-determined average threshold.

9. The method of claim 8, wherein determining whether there is a match between the at least some of the values representative of the determined geometrical features of the hand and the corresponding at least some of the record values representative of the geometric features determined from the image data for the one of the previously acquired RGB and NIR images comprises determining that the at least some of the values representative of the determined geometrical features of the hand match the corresponding at least some of the record values representative of the geometric features determined from the image data for one of the previously acquired RGB and NIR images when:
the computed standard deviation for the difference between the at least some of the values representative of the determined geometrical features of the hand and the corresponding at least some of the record values representative of the geometric features determined from the image data for the one of the previously acquired RGB and NIR images is less than the standard deviation threshold, and the computed average for the difference between the at least some of the values representative of the determined geometrical features of the hand and the corresponding at least some of the record values representative of the geometric features determined from the image data for the one of the previously acquired RGB and NIR images is less than the average threshold; or
the computed standard deviation for the difference between the at least some of the values representative of the determined geometrical features of the hand and the corresponding at least some of the record values representative of the geometric features determined from the image data for the one of the previously acquired RGB and NIR images is higher than or equal to the standard deviation threshold, and the computed average for the difference between the at least some of the values representative of the determined geometrical features of the hand and the corresponding at least some of the record values representative of the geometric features determined from the image data for the one of the previously acquired RGB and NIR images is less than a second average threshold smaller than the average threshold.

10. The method of claim 8, further comprising:
enabling the person access to a computing device in response to a determination that there is the match between the at least some of the values representative of the determined geometrical features of the hand and the corresponding at least some of the records values representative of the geometric features determined from the image data for the one of the previously acquired RGB and NIR images.

11. A device comprising:
an RGB image capturing unit;
a near infrared (NIR) image capturing unit;
one or more processors; and
storage media comprising computer instructions that, when executed on the one or more processors, cause operations comprising:

capturing with the RGB image capturing unit an RGB image of a hand of a person;

capturing with the NIR image capturing device an NIR image of the hand;

producing a resultant binary image from the RGB image and the NIR image using reflectance values derived from pixels of the RGB image and corresponding pixels of the NIR image, the resultant binary image comprising a first binary pixel value for skin tissue areas in the RGB image and the NIR image corresponding to the hand of the person, the resultant binary image further comprising a second binary pixel value for non-skin areas in the RGB image and the NIR image, wherein the first binary pixel value is determined for a pixel of the binary image when a first value associated with the pixel is within a first predetermined value range and when a second value associated with the pixel is within a second predetermined value range, the first value being determined based on a comparison between a reflectance value of a color component of a pixel of the RGB image and a reflectance value of a corresponding pixel of the NIR image, and the second value being determined based on a comparison between a reflectance value of a first color component of the pixel and a reflectance value of a second color component of the pixel;

determining, from the resultant binary image with the extracted hand image data corresponding to the skin tissue of the hand of the person, geometrical features of the hand; and determining whether the person is authorized to access a device based on the geometric features of the hand extracted from the resultant binary image.

12. The device of claim 11, further comprising:

aligning the captured RGB image with the captured NIR image.

13. The device of claim 11, wherein the first value, $r_1$, and the second value, $r_2$, are skin color indicators for the particular pixel that are computed according to:

$$r_1 = \frac{\rho(\lambda_{NIR}) - \rho(\lambda_{GREEN})}{\rho(\lambda_{NIR}) + \rho(\lambda_{GREEN})}$$

$$r_2 = \frac{\rho(\lambda_{GREEN}) - \rho(\lambda_{RED})}{\rho(\lambda_{GREEN}) + \rho(\lambda_{RED})}$$

where $\rho$ denotes a reflectance rate and $\lambda$ denotes a wavelength.

14. The device of claim 11, wherein determining the geometrical features comprises:

determining from the resultant binary image one or more values representative of relative spatial features for the hand, wherein the relative spatial features comprise one or more of: an angle between a first pair of two fingers in the resultant binary image comprising the extracted hand image data, or a relative distance or length for a second pair of fingers in the resultant binary image comprising the extracted hand image data.

15. The device of claim 11, wherein determining whether the person is authorized to access the device comprises:

comparing values representative of the determined geometrical features of the hand to values in stored records, each record containing respective corresponding record values representative of geometric features determined from image data for respective ones of previously acquired RGB and NIR images.

16. The device of claim 15, wherein comparing the values representative of the determined geometrical features of the hand to the values in the stored records comprises:

computing a standard deviation for a difference between at least some of the values representative of the determined geometrical features of the hand and corresponding at least some record values representative of geometric features determined from the image data for one of the previously acquired RGB and NIR images;

computing an average value for the difference between the at least some of the values representative of the determined geometrical features of the hand and the corresponding at least some of the record values representative of the geometric features determined from the image data for the one of the previously acquired RGB and NIR images; and determining whether there is a match between the at least some of the values representative of the determined geometrical features of the hand and the corresponding at least some of the records values representative of the geometric features determined from the image data for the one of the previously acquired RGB and NIR images based on a first comparison of the computed standard deviation to a pre-determined standard deviation threshold, and based on a second comparison of the computed average to a pre-determined average threshold.

17. An apparatus comprising:

means for capturing an RGB image of a hand of a person;

means for capturing a near infrared (NIR) image of the hand;

means for producing a resultant binary image from the RGB image and the NIR image using reflectance values derived from pixels of the RGB image and corresponding pixels of the NIR image, the resultant binary image comprising a first binary pixel value for skin tissue areas in the RGB image and the NIR image corresponding to the hand of the person, the resultant binary image further comprising a second binary pixel value for non-skin areas in the RGB image and the NIR image, wherein the first binary pixel value is determined for a pixel of the binary image when a first value associated with the pixel is within a first predetermined value range and when a second value associated with the pixel is within a second predetermined value range, the first value being determined based on a comparison between a reflectance value of a color component of a pixel of the RGB image and a reflectance value of a corresponding pixel of the NIR image, and the second value being determined based on a comparison between a reflectance value of a first color component of the pixel and a reflectance value of a second color component of the pixel;

means for determining, from the resultant binary image with the extracted hand image data corresponding to the skin tissue of the hand of the person, geometrical features of the hand; and means for determining whether the person is authorized to access a device based on the geometric features of the hand extracted from the resultant binary image.

18. The apparatus of claim 17, further comprising:

means for aligning the captured RGB image with the captured NIR image.

19. The apparatus of claim 17, wherein the first value, $r_1$, and the second value, $r_2$, are skin color indicators for the particular pixel that are computed according to:

$$r_1 = \frac{\rho(\lambda_{NIR}) - \rho(\lambda\rho_{GREEN})}{\rho(\lambda_{NIR}) + \rho(\lambda_{GREEN})}$$

$$r_2 = \frac{\rho(\lambda_{GREEN}) - \rho(\lambda_{RED})}{\rho(\lambda_{GREEN}) + \rho(\lambda_{RED})}$$

where $\rho$ denotes a reflectance rate and $\lambda$ denotes a wavelength.

20. The apparatus of claim 17, wherein the means for determining the geometrical features comprises:
    means for determining from the resultant binary image one or more values representative of relative spatial features for the hand, wherein the relative spatial features comprise one or more of: an angle between a first pair of two fingers in the resultant binary image comprising the extracted hand image data, or a relative distance or length for a second pair of fingers in the resultant binary image comprising the extracted hand image data.

21. The apparatus of claim 17, wherein the means for determining whether the person is authorized to access the device comprises:
    means for comparing values representative of the determined geometrical features of the hand to values in stored records, each record containing respective corresponding record values representative of geometric features determined from image data for respective ones of previously acquired RGB and NIR images.

22. The apparatus of claim 21, wherein the means for comparing the values representative of the determined geometrical features of the hand to the values in the stored records comprises:
    means for computing a standard deviation for a difference between at least some of the values representative of the determined geometrical features of the hand and corresponding at least some record values representative of geometric features determined from the image data for one of the previously acquired RGB and NIR images;
    means for computing an average value for the difference between the at least some of the values representative of the determined geometrical features of the hand and the corresponding at least some of the record values representative of the geometric features determined from the image data for the one of the previously acquired RGB and NIR images; and
    means for determining whether there is a match between the at least some of the values representative of the determined geometrical features of the hand and the corresponding at least some of the records values representative of the geometric features determined from the image data for the one of the previously acquired RGB and NIR images based on a first comparison of the computed standard deviation to a pre-determined standard deviation threshold, and based on a second comparison of the computed average to a pre-determined average threshold.

23. A non-transitory processor readable media programmed with computer instructions executable on a processor that, when executed, cause operations comprising:
    capturing an RGB image of a hand of a person;
    capturing a near infrared (NIR) image of the hand;
    producing a resultant binary image from the RGB image and the NIR image using reflectance values derived from pixels of the RGB image and corresponding pixels of the NIR image, the resultant binary image comprising a first binary pixel value for skin tissue areas in the RGB image and the NIR image corresponding to the hand of the person, the resultant binary image further comprising a second binary pixel value for non-skin areas in the RGB image and the NIR image, wherein the first binary pixel value is determined for a pixel of the binary image when a first value associated with the pixel is within a first predetermined value range and when a second value associated with the pixel is within a second predetermined value range, the first value being determined based on a comparison between a reflectance value of a color component of a pixel of the RGB image and a reflectance value of a corresponding pixel of the NIR image, and the second value being determined based on a comparison between a reflectance value of a first color component of the pixel and a reflectance value of a second color component of the pixel;
    determining, from the resultant binary image with the extracted hand image data corresponding to the skin tissue of the hand of the person, geometrical features of the hand; and
    determining whether the person is authorized to access a device based on the geometric features of the hand extracted from the resultant binary image.

24. The processor readable media of claim 23, further comprising:
    aligning the captured RGB image with the captured NIR image.

25. The processor readable media of claim 23, wherein the first value, $r_1$, and the second value, $r_2$, are skin color indicators for the particular pixel that are computed according to:

$$r_1 = \frac{\rho(\lambda_{NIR}) - \rho(\lambda\rho_{GREEN})}{\rho(\lambda_{NIR}) + \rho(\lambda_{GREEN})}$$

$$r_2 = \frac{\rho(\lambda_{GREEN}) - \rho(\lambda_{RED})}{\rho(\lambda_{GREEN}) + \rho(\lambda_{RED})}$$

where $\rho$ denotes a reflectance rate and $\lambda$ denotes a wavelength.

26. The processor readable media of claim 23, wherein determining the geometrical features comprises:
    determining from the resultant binary image one or more values representative of relative spatial features for the hand, wherein the relative spatial features comprise one or more of: an angle between a first pair of two fingers in the resultant binary image comprising the extracted hand image data, or a relative distance or length for a second pair of fingers in the resultant binary image comprising the extracted hand image data.

27. The processor readable media of claim 23, wherein the computer instructions to cause determining whether the person is authorized to access the device comprise further instructions that, when executed, cause operations comprising:
    comparing values representative of the determined geometrical features of the hand to values in stored records, each record containing respective corresponding record values representative of geometric features determined from image data for respective ones of previously acquired RGB and NIR images.

28. The processor readable media of claim 27, wherein comparing the values representative of the determined geometrical features of the hand to the values in the stored records comprises:
- computing a standard deviation for a difference between at least some of the values representative of the determined geometrical features of the hand and corresponding at least some record values representative of geometric features determined from the image data for one of the previously acquired RGB and NIR images;
- computing an average value for the difference between the at least some of the values representative of the determined geometrical features of the hand and the corresponding at least some of the record values representative of the geometric features determined from the image data for the one of the previously acquired RGB and NIR images; and
- determining whether there is a match between the at least some of the values representative of the determined geometrical features of the hand and the corresponding at least some of the records values representative of the geometric features determined from the image data for the one of the previously acquired RGB and NIR images based on a first comparison of the computed standard deviation to a pre-determined standard deviation threshold, and based on a second comparison of the computed average to a pre-determined average threshold.

29. The method of claim 7, further comprising:
- randomly selecting a hand profile from a plurality of hand profiles associated with each of a plurality of persons;
- wherein comparing the values representative of the determined geometrical features of the hand to the values in the stored records comprises:
- comparing the values representative of the determined geometrical features of the hand to the values in selected ones of the stored records associated with the selected profile.

30. The method of claim 1, wherein determining whether the person is authorized to access the device comprises:
- determining whether the person is authorized to access the device based on comparison of the determined geometric features of the hand of the person to geometric hand features, for one or more persons authorized to access the device, determined from previous binary images produced from RGB and NIR images previously acquired for each of the one or more persons.

* * * * *

UNITED STATES PATENT AND TRADEMARK OFFICE
CERTIFICATE OF CORRECTION

PATENT NO. : 9,996,726 B2
APPLICATION NO. : 14/168267
DATED : June 12, 2018
INVENTOR(S) : An M. Chen et al.

It is certified that error appears in the above-identified patent and that said Letters Patent is hereby corrected as shown below:

Column 21, Claim 3, Line 14:
Replace "wherein the first value, $r_i$, and the second value," with --wherein the first value, $r_1$, and the second value--

Column 21, Claim 3, Line 19:
Replace "$r_1 = \frac{\rho(\lambda_{NIR})-\rho(\lambda\rho_{GREEN})}{\rho(\lambda_{NIR})+\rho(\lambda_{GREEN})}$" with --$r_1 = \frac{\rho(\lambda_{NIR})-\rho(\lambda_{GREEN})}{\rho(\lambda_{NIR})+\rho(\lambda_{GREEN})}$--

Column 23, Claim 13, Line 39:
Replace "wherein the first value, $r_i$, and the second value," with --wherein the first value, $r_1$, and the second value--

Column 23, Claim 13, Line 44:
Replace "$r_1 = \frac{\rho(\lambda_{NIR})-\rho(\lambda\rho_{GREEN})}{\rho(\lambda_{NIR})+\rho(\lambda_{GREEN})}$" with --$r_1 = \frac{\rho(\lambda_{NIR})-\rho(\lambda_{GREEN})}{\rho(\lambda_{NIR})+\rho(\lambda_{GREEN})}$--

Column 25, Claim 19, Line 1:
Replace "wherein the first value, $r_i$, and the second value," with --wherein the first value, $r_1$, and the second value--

Column 25, Claim 19, Line 6:
Replace "$r_1 = \frac{\rho(\lambda_{NIR})-\rho(\lambda\rho_{GREEN})}{\rho(\lambda_{NIR})+\rho(\lambda_{GREEN})}$" with --$r_1 = \frac{\rho(\lambda_{NIR})-\rho(\lambda_{GREEN})}{\rho(\lambda_{NIR})+\rho(\lambda_{GREEN})}$--

Column 26, Claim 25, Line 36:
Replace "wherein the first value, $r_i$, and the second value," with --wherein the first value, $r_1$, and the second value--

Signed and Sealed this
Twenty-eighth Day of August, 2018

Andrei Iancu
*Director of the United States Patent and Trademark Office*

CERTIFICATE OF CORRECTION (continued)
U.S. Pat. No. 9,996,726 B2

Column 26, Claim 25, Line 42:

Replace "$r_1 = \frac{\rho(\lambda_{NIR})-\rho(\lambda\rho_{GREEN})}{\rho(\lambda_{NIR})+\rho(\lambda_{GREEN})}$" with --$r_1 = \frac{\rho(\lambda_{NIR})-\rho(\lambda_{GREEN})}{\rho(\lambda_{NIR})+\rho(\lambda_{GREEN})}$--